US011973701B2

United States Patent
Noh et al.

(10) Patent No.: US 11,973,701 B2
(45) Date of Patent: *Apr. 30, 2024

(54) METHOD FOR UPLINK CHANNEL ACCESS TO UNLICENSED BAND IN WIRELESS COMMUNICATION SYSTEM, AND DEVICE THEREFOR

(71) Applicant: WILUS INSTITUTE OF STANDARDS AND TECHNOLOGY INC., Gyeonggi-do (KR)

(72) Inventors: Minseok Noh, Seoul (KR); Jinsam Kwak, Gyeonggi-do (KR); Juhyung Son, Gyeonggi-do (KR)

(73) Assignee: WILUS INSTITUTE OF STANDARDS AND TECHNOLOGY INC., Gyeonggi-Do (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/712,071

(22) Filed: Apr. 2, 2022

(65) Prior Publication Data

US 2022/0225350 A1 Jul. 14, 2022

Related U.S. Application Data

(63) Continuation of application No. 16/929,058, filed on Jul. 14, 2020, now Pat. No. 11,330,609, which is a (Continued)

(30) Foreign Application Priority Data

Mar. 23, 2016 (KR) .................. 10-2016-0034934
Mar. 31, 2016 (KR) .................. 10-2016-0039811
May 13, 2016 (KR) .................. 10-2016-0059131

(51) Int. Cl.
*H04W 16/14* (2009.01)
*H04L 5/00* (2006.01)
(Continued)

(52) U.S. Cl.
CPC ............ *H04L 5/001* (2013.01); *H04L 5/0053* (2013.01); *H04L 5/0094* (2013.01);
(Continued)

(58) Field of Classification Search
CPC . H04W 72/23; H04W 16/14; H04W 72/0446; H04W 72/0453; H04L 5/0053; H04L 5/0094
(Continued)

(56) References Cited

U.S. PATENT DOCUMENTS 10,757,717 B2 * 8/2020 Noh ................. H04W 72/042
11,330,609 B2   5/2022 Noh et al.
(Continued)

FOREIGN PATENT DOCUMENTS

AU    2014268767    12/2015
CN    102415187     4/2012
(Continued)

OTHER PUBLICATIONS

Office Action dated Oct. 19, 2021 for Korean Patent Application No. 10-2021-7023691 and its English translation provided by Applicant's foreign counsel.
(Continued)

*Primary Examiner* — Dang T Ton
(74) *Attorney, Agent, or Firm* — Ladas & Parry, LLP

(57) ABSTRACT

A method for performing an uplink transmission to a base station by a user equipment through an unlicensed cell in a wireless communication system is provided. The method includes: receiving an uplink grant that schedules the uplink transmission in at least one subframe from the base station; and performing the uplink transmission in the at least one subframe using at least one of a first type channel access or a second type channel access. The uplink transmission is performed using the second type channel access when all of
(Continued)

the at least one subframe is included in a predetermined interval determined based on a downlink transmission through the unlicensed cell from the base station.

12 Claims, 22 Drawing Sheets

Related U.S. Application Data continuation of application No. 16/138,927, filed on Sep. 21, 2018, now Pat. No. 10,757,717, which is a continuation of application No. PCT/KR2017/003084, filed on Mar. 22, 2017.

(51) Int. Cl.
| | |
|---|---|
| H04L 27/26 | (2006.01) |
| H04W 72/0446 | (2023.01) |
| H04W 72/0453 | (2023.01) |
| H04W 72/12 | (2023.01) |
| H04W 72/23 | (2023.01) |
| H04W 74/0808 | (2024.01) |

(52) U.S. Cl.
CPC ......... *H04L 27/2602* (2013.01); *H04W 16/14* (2013.01); *H04W 72/0446* (2013.01); *H04W 72/0453* (2013.01); *H04W 72/1215* (2013.01); *H04W 72/23* (2023.01); *H04W 74/0808* (2013.01)

(58) Field of Classification Search
USPC ........................................ 370/400, 329, 395
See application file for complete search history.

(56) References Cited

U.S. PATENT DOCUMENTS

| | | | |
|---|---|---|---|
| 2002/0163933 | A1 | 11/2002 | Benveniste |
| 2007/0206547 | A1 | 9/2007 | Gong et al. |
| 2010/0135319 | A1 | 6/2010 | Wang et al. |
| 2012/0184265 | A1 | 7/2012 | Love et al. |
| 2013/0107116 | A1 | 5/2013 | Charbit et al. |
| 2013/0329625 | A1 | 12/2013 | Lee et al. |
| 2014/0036881 | A1 | 2/2014 | Kim et al. |
| 2014/0044000 | A1 | 2/2014 | Charbit et al. |
| 2014/0050130 | A1 | 2/2014 | Kim et al. |
| 2014/0105158 | A1 | 4/2014 | Kim et al. |
| 2014/0112280 | A1 | 4/2014 | Lee et al. |
| 2014/0348094 | A1 | 11/2014 | Charbit et al. |
| 2014/0362780 | A1 | 12/2014 | Malladi et al. |
| 2015/0092703 | A1 | 4/2015 | Xu et al. |
| 2015/0245232 | A1 | 8/2015 | Luo et al. |
| 2015/0319701 | A1 | 11/2015 | Ng et al. |
| 2015/0341921 | A1 | 11/2015 | Chen et al. |
| 2016/0057770 | A1 | 2/2016 | Yerramalli et al. |
| 2016/0073344 | A1 | 3/2016 | Vutukuri et al. |
| 2016/0143014 | A1 | 5/2016 | Mukheijee et al. |
| 2017/0048879 | A1 | 2/2017 | Zhang et al. |
| 2017/0188387 | A1 | 6/2017 | Mukherjee et al. |
| 2017/0251464 | A1 | 8/2017 | Mukherjee |
| 2017/0280475 | A1 | 9/2017 | Yerramalli et al. |
| 2017/0280476 | A1 | 9/2017 | Yerramalli et al. |
| 2017/0332245 | A1 | 11/2017 | Huang et al. |
| 2018/0124611 | A1 | 5/2018 | Moon et al. |
| 2018/0206269 | A1* | 7/2018 | Bhorkar ................ H04W 72/14 |
| 2019/0037582 | A1 | 1/2019 | Noh et al. |
| 2019/0313450 | A1 | 10/2019 | Mukherjee et al. |
| 2021/0007115 | A1 | 1/2021 | Noh et al. |
| 2021/0168770 | A1 | 6/2021 | Oh et al. |
| 2021/0378010 | A1 | 12/2021 | Luo et al. |

FOREIGN PATENT DOCUMENTS

| | | |
|---|---|---|
| CN | 102870366 | 1/2013 |
| CN | 102986281 | 3/2013 |
| CN | 103270714 | 8/2013 |
| CN | 103518415 | 1/2014 |
| CN | 103548409 | 1/2014 |
| CN | 104365169 | 2/2015 |
| CN | 104540158 | 4/2015 |
| CN | 104662994 | 5/2015 |
| CN | 105101446 | 11/2015 |
| CN | 105230102 | 1/2016 |
| CN | 105282858 | 1/2016 |
| CN | 105409138 | 3/2016 |
| CN | 114499807 | 5/2022 |
| EP | 3 435 725 | 1/2019 |
| JP | 2015-515160 | 5/2015 |
| JP | 5746364 | 7/2015 |
| JP | 2015-149723 | 8/2015 |
| KR | 10-2007-0095774 | 10/2007 |
| KR | 10-2012-0130100 | 11/2012 |
| KR | 10-2013-0009959 | 1/2013 |
| KR | 10-2013-0097586 | 9/2013 |
| KR | 10-2016-0010587 | 1/2016 |
| KR | 10-2016-0013508 | 2/2016 |
| KR | 10-2016-0026555 | 3/2016 |
| KR | 10-2018-0120201 | 11/2018 |
| WO | 2011/062393 | 5/2011 |
| WO | 2012/078565 | 6/2012 |
| WO | 2013/116662 | 8/2013 |
| WO | 2013/149387 | 10/2013 |
| WO | 2015/065029 | 5/2015 |
| WO | 2016/013781 | 1/2016 |
| WO | 2016/081375 | 5/2016 |
| WO | 2017/074638 | 5/2017 |
| WO | 2017/164647 | 9/2017 |

OTHER PUBLICATIONS

Office Action dated Jul. 19, 2022 for Korean Patent Application No. 10-2022-7021156 and its English translation provided by Applicant's foreign counsel.
International Search Report for PCT/KR2017/003084 dated Jul. 14, 2017, and its English translation from WIPO (published as WO 2017/164647).
Written Opinion of the International Searching Authority for PCT/KR2017/003084 dated Jul. 14, 2017 and its English machine translation by Google Translate (published as WO 2017/164647).
Intel Corporation, "Category 4 Based LBT Design for LAA Downlink". R1-152646. 3GPP TSG RAN WG1 RAN1#81, Fukuoka, Japan, May 16, 2015, see sections 1-2; and figure 1.
Extended European Search Report dated Sep. 17, 2019 for EP Patent Application No. 17770689.2.
Extended European Search Report dated Sep. 30, 2019 for EP Patent Application No. 17770617.3.
Non-Final Office Action dated Nov. 22, 2019 for U.S. Appl. No. 16/147,577.
LG Electronics: "LBT schemes in LAA UL", 3GPP TSG RAN WG1 Meeting #84, St Julian's, Malta, Feb. 15-19, 2016; Draft: R1-160630; $3^{rd}$ Generation Partnership Project (3GPP), Mobile Competence Centre, 650, Route Des Lucioles, F-06921 Sophia-Antipolis Cedes, France, Feb. 6, 2016, XP051064267, Agenda Item: 7.3.1.5, pp. 1-10.
ZTE: "UL framework for LAA". 3GPP TSG RAN WG1 Meeting #83, Anaheim, USA, Nov. 15-22, 2015; Document for: Discussion and Decision; Draft: R1-156994 UL; $3^{rd}$ Generation Partnership Project (3GPP), Mobile Competence Centre; 650. Route Des Lucioles; F-06921 Sophia-Antipolis Cedes, France; Nov. 7, 2015, XP051022611, Agenda Item: 6.2.3.1, pp. 1-6.
Mediatek Inc.: "Uplink channel access in LAA", 3GPP TSG RAN WG1 Meeting #84, St Julian's, Malta, Feb. 15-19, 2016; Draft: R1-160976; $3^{rd}$ Generation Partnership Project (3GPP), Mobile Competence Centre; 650. Route Des Lucioles; F-06921 Sophia-Antipolis Cedes, France; Feb. 24, 2016, XP051079075, Agenda Item: 7.3.1.5, pp. 1-11.

(56) References Cited

OTHER PUBLICATIONS

LG Electronics: "PUSCH transmission in LAA", 3GPP TSG RAN WG1 Meeting #84, St Julian's, Malta, Feb. 15-19, 2016; Draft: R1-160625 LAA PUSCH; $3^{rd}$ Generation Partnership Project (3GPP), Mobile Competence Centre; 650, Route Des Lucioles; F-06921 Sophia-Antipolis Cedes, France; Feb. 14, 2016, XP051053954, Agenda Item: 7.3.1.1, pp. 1-5.
Ericsson: "On Coordinated UL Channel Access for Enhanced LAA", 3GPP TSG RAN WG1 Meeting #84, St Julian's, Malta, Feb. 15-19, 2016; Draft: R1-161000; $3^{rd}$ Generation Partnership Project (3GPP), Mobile Competence Centre; 650, Route Des Lucioles; F-06921 Sophia-Antipolis Cedes, France; Feb. 6, 2016, XP051064484, Agenda Item: 7.3.1.5, pp. 1-3.
ETSI TS 136 321 V13.0.0, Feb. 2016: LTE; Evolved Universal Terrestrial Radio Access (E_UTRA); Medium Access Control (MAC) protocol specification (3GPP TS 36.321 version 13.0.0 Release 13), pp. 1-84.
Non-Final Office Action dated Jan. 16, 2020 for U.S. Appl. No. 16/138,936.
Notice of Allowance dated Mar. 27, 2020 for U.S. Appl. No. 16/147,577.
Notice of Allowance dated May 29, 2020 for U.S. Appl. No. 16/138,936.
Supplemental Notice of Allowance dated Jul. 6, 2020 for U.S. Appl. No. 16/138,927 (now published as U.S. 2019/0037582).
Supplemental Notice of Allowance dated Jun. 2, 2020 for U.S. Appl. No. 16/138,927 (now published as U.S. 2019/0037582).
Notice of Allowance dated Apr. 9, 2020 for U.S. Appl. No. 16/138,927 (now published as U.S. 2019/0037582).
Advisory Action dated Mar. 23, 2020 for U.S. Appl. No. 16/138,927 (now published as U.S. 2019/0037582).
Final Office Action dated Mar. 6, 2020 for U.S. Appl. No. 16/138,927 (now published as U.S. 2019/0037582).
Office Action dated Dec. 2, 2019 for U.S. Appl. No. 16/138,927 (now published as U.S. 2019/0037582).
Office Action for Indian Patent Application No. 201927006912 dated Aug. 31, 2020.
Office Action for Chinese Patent Application No. 201780030922.9 dated Sep. 22, 2020 and its English translation provided by Applicant's foreign counsel.
Huawei, HiSilicon: "Analysis on LBT with category 2 and 4 for eLAAA", R1-160297, 3GPP TSG RAN WG1 Meeting #84, St. Julian's, Malta, Feb. 15-19, 2016, pp. 1-5.
Samsung: "Discussion on LBT for UL Grant", R1-160568, 3GPP TSG RAN WG1 #84, St. Julian's, Malta, Feb. 15-19, 2016, pp. 1-3.
Nokia Networks, Alcatel-Lucent, Alcatel-Lucent Shanghai Bell: "Channel Access for the Support of LAA UL", R1-160914, 3GPP TSG RAN WG1 Meeting #84, St. Julian's, Malta, Feb. 15-19, 2016, pp. 1-7.
Office Action for Indian Patent Application No. 201827040249 dated Nov. 4, 2020.
Office Action for Korean Patent Application No. 10-2018-7027541 dated Jan. 21, 2021 and its English translation provided by Applicant's foreign counsel.
Ericsson: "On UL Cannel Access Procedures for Enhanced LAA", R1-161001, 3GPP TSG RAN WG1 Meeting #84, St. Julian', Malta, Feb. 15-19, 2016, pp. 1-8.
Office Action for Korean Patent Application No. 10-2018-7028131 dated Jan. 26, 2021 and its English translation provided by Applicant's foreign counsel.
Broadcom Corporation: "Discussion on Triggering Mechanisms to Adapt LBT Contention Window Size", R1-155548, 3GPP TSG WAN WG1 Meeting #82-BIS, Malmo, Sweden, Oct. 5-9, 2015, pp. 1-14.
Office Action for Indian Patent Application No. 201827038794 dated Mar. 23, 2021.
Office Action for European Patent Application No. 17 770 617.3 dated Feb. 15, 2021.
Office Action for European Patent Application No. 17 770 689.2 dated Feb. 8, 2021.

Office Action for Chinese Patent Application No. 201780030922.9 dated Apr. 30, 2021 and its English translation provided by Applicant's foreign counsel.
Office Action for Korean Patent Application No. 10-2018-7027545 dated Jun. 8, 2021 and its English translation provided by Applicant's foreign counsel.
Notice of Allowance dated Sep. 10, 2021 for U.S. Appl. No. 16/924,142.
Office Action dated Sep. 9, 2021 for Korean Patent Application No. 10-2021-7024472 and its English translation provided by the Applicant's foreign counsel.
Office Action dated Sep. 17, 2021 for Korean Patent Application No. 10-2021-7023122 and its English translation provided by the Applicant's foreign counsel.
Office Action dated Aug. 13, 2021 for Chinese Patent Application No. 201780018454.3 and its English translation provided by the Applicant's foreign counsel.
Notice of Allowance dated Oct. 28, 2021 for Chinese Patent Application No. 201780030922.9 and its English translation provided by the Applicant's foreign counsel.
Notice of Allowance dated Jan. 14, 2022 for Chinese Patent Application No. 201780018454.3 and its English translation provided by the Applicant's foreign counsel.
Notice of Allowance dated Mar. 21, 2022 for Korean Patent Application No. 10-2021-7023691 and its English translation provided by the Applicant's foreign counsel.
Office Action dated Mar. 21, 2022 for Korean Patent Application No. 10-2021-7023122 and its English translation provided by the Applicant's foreign counsel.
Office Action dated Mar. 23, 2022 for Korean Patent Application No. 10-2021-7024472 and its English translation provided by the Applicant's foreign counsel.
Notice of Allowance dated Jan. 10, 2022 for U.S. Appl. No. 16/929,058 (now published as U.S. 2021/0007115).
Office Action dated Aug. 25, 2021 for U.S. Appl. No. 16/929,058 (now published as U.S. 2021/0007115).
Notice of Allowance dated Sep. 1, 2022 for Korean Patent Application No. 10-2021-7023122 and its English translation from Global Dossier.
Notice of Allowance dated Sep. 16, 2022 for Korean Patent Application No. 10-2021-7024472 and its English translation provided by Applicant's foreign counsel.
Office Action dated Nov. 4, 2022 for European Patent Application No. 17 770 689.2.
Office Action dated Dec. 1, 2022 for U.S. Appl. No. 17/548,442.
Notice of Allowance dated Nov. 25, 2022 for European Patent Application No. 17 770 617.3.
Notice of Allowance dated Dec. 14, 2022 for Korean Patent Application No. 10-2021-7023122 and its English translation provided by Applicant's foreign counsel.
Notice of Allowance dated Jan. 25, 2023 for Korean Patent Application No. 10-2022-7021156 and its English translation provided by Applicant's foreign counsel.
Notice of Allowance dated Feb. 7, 2023 for Korean Patent Application No. 10-2022-7042370 and its English translation provided by Applicant's foreign counsel.
Office Action dated Jul. 21, 2023 for Korean Patent Application No. 10-2022-7044161 and its English translation provided by Applicant's foreign counsel.
Notice of Allowance dated Jul. 25, 2023 for Korean Patent Application No. 10-2023-7015610 and its English translation provided by Applicant's foreign counsel.
Office Action dated Apr. 18, 2023 for U.S. Appl. No. 17/548,442.
Notice of Hearing dated Apr. 18, 2023 for Indian Patent Application No. 201827038794.
Notice of Allowance dated Jul. 4, 2023 for Korean Patent Application No. 10-2023-7012743 and its English translation provided by Applicant's foreign counsel.
Extended European Search Report dated Jun. 9, 2023 for European Patent Application No. 23164463.4.
Sony Corporation: "UL Channel access mechanism design in eLAA", 3GPP TSG RAN WG1 Meeting #84, R1-160674, St Julian's, Malta, Feb. 6, 2016, pp. 1-3.

(56) References Cited

OTHER PUBLICATIONS

Huawei, HiSilicon: "UL LBT to enable UE multiplexing of uplink transmissions", 3GPP TSG RAN WG1 Meeting #84, R1-160280, St Julian's, Malta, Feb. 6, 2016, pp. 1-6.
Notice of Hearing dated Sep. 13, 2023 for Indian Patent Application No. 201827040249.
Notice of Allowance dated Oct. 26, 2023 for U.S. Appl. No. 17/015,055.
Notice of Allowance dated Nov. 14, 2023 for Korean Patent Application No. 10-2023-7015610 and its English translation provided by Applicant's foreign counsel.
Office Action dated Nov. 15, 2023 for Korean Patent Application No. 10-2023-7036841 and its English translation provided by Applicant's foreign counsel.
Office Action dated Dec. 27, 2023 for Korean Patent Application No. 10-2023-7033915 and its English translation provided by Applicant's foreign counsel.
Notice of Allowance dated Jan. 23, 2024 for Korean Patent Application No. 10-2022-7044161 and its English translation provided by Applicant's foreign counsel.
Office Action dated Jan. 25, 2024 for Chinese Patent Application No. 202210031992.9 and its English translation provided by Applicant's foreign counsel.
Office Action dated Feb. 5, 2024 for Chinese Patent Application No. 202210031169.8 and its English translation provided by Applicant's foreign counsel.
Notice of Allowance dated Feb. 8, 2024 for Chinese Patent Application No. 202210031956.2 and its English translation provided by Applicant's foreign counsel.
Notice of Allowance dated Feb. 13, 2024 for European Patent Application No. 17 770 689.2.
Office Actions dated Mar. 6, 2024 for U.S. Appl. No. 18/233,884.

* cited by examiner (a) LAA DL transmission burst starting with a regular subframe (b) LAA DL transmission burst starting with a partial subframe

METHOD FOR UPLINK CHANNEL ACCESS TO UNLICENSED BAND IN WIRELESS COMMUNICATION SYSTEM, AND DEVICE THEREFOR

CROSS-REFERENCE TO RELATED APPLICATIONS

This application is a continuation of U.S. patent application Ser. No. 16/929,058 filed on Jul. 14, 2020, which is a continuation of U.S. patent application Ser. No. 16/138,927 filed on Sep. 21, 2018, now issued as U.S. Pat. No. 10,757,717 dated Aug. 25, 2020, which is a continuation of International Patent Application No. PCT/KR2017/003084 filed on Mar. 22, 2017, which claims the priority to Korean Patent Application No. 10-2016-0034934 filed in the Korean Intellectual Property Office on Mar. 23, 2016, Korean Patent Application No. 10-2016-0039811 filed in the Korean Intellectual Property Office on Mar. 31, 2016, and Korean Patent Application No. 10-2016-0059131 filed in the Korean Intellectual Property Office on May 13, 2016, the entire contents of which are incorporated herein by reference.

TECHNICAL FIELD

The present invention relates to a wireless communication system. Specifically, the present invention relates to a method for accessing an uplink channel in an unlicensed band in a wireless communication system and a device therefor.

BACKGROUND ART

In recent years, with an explosive increase of mobile traffic due to the spread of smart devices, it has been difficult to cope with data usage which increases for providing a cellular communication service only by a conventional licensed frequency spectrum or LTE-licensed frequency band.

In such a situation, a scheme that uses an unlicensed (alternatively, unauthorized, non-licensed, or license unnecessary) frequency spectrum or LTE-Unlicensed frequency band (e.g., 2.4 GHz band, 5 GHz band, or the like) for providing the cellular communication service has been devised as a solution for a spectrum shortage problem.

However, unlike the licensed band in which a communication service provider secures an exclusive frequency use right through a procedure such as auction, or the like, in the unlicensed band, multiple communication facilities can be used simultaneously without limit when only a predetermined level of adjacent band protection regulation is observed. As a result, when the unlicensed band is used in the cellular communication service, it is difficult to guarantee communication quality at a level provided in the licensed band and an interference problem with a conventional wireless communication device (e.g., wireless LAN device) using the unlicensed band may occur.

Therefore, a research into a coexistence scheme with the conventional unlicensed band device and a scheme for efficiently sharing a radio channel needs to be preferentially made in order to settle an LTE technology in the unlicensed band. That is, a robust coexistence mechanism (RCM) needs to be developed in order to prevent a device using the LTE technology in the unlicensed band from influencing the conventional unlicensed band device.

DISCLOSURE

Technical Problem

The present invention has been made in an effort to provide a method for efficiently transmitting a signal in a wireless communication system, in particular, a cellular wireless communication system and an apparatus therefor. Further, the present invention has been made in an effort to provide a method for efficiently transmitting a signal in a specific frequency band (e.g., unlicensed band) and an apparatus therefor.

Technical objects desired to be achieved in the present invention are not limited to the aforementioned objects, and other technical objects not described above will be apparently understood by those skilled in the art from the following disclosure.

Technical Solution

According to one aspect of the present invention, a provided is method for performing an uplink transmission to a base station by a user equipment through an unlicensed cell in a wireless communication system, the method including: receiving an uplink grant that schedules the uplink transmission in at least one subframe from the base station; and performing the uplink transmission in the at least one subframe using at least one of a first type channel access or a second type channel access. The uplink transmission is performed using the second type channel access when all of the at least one subframe is included in a predetermined interval determined based on a downlink transmission through the unlicensed cell from the base station.

In addition, according to one aspect of the present invention, provided is a user equipment of a wireless communication system, the user equipment including: a wireless communication module; and a processor configured to receive an uplink grant that schedules the uplink transmission in at least one subframe from the base station and perform the uplink transmission in the at least one subframe using at least one of a first type channel access or a second type channel access. The processor is configured to perform the uplink transmission using the second type channel access when all of the at least one subframe is included in a predetermined interval determined based on a downlink transmission through the unlicensed cell from the base station.

Preferably, the uplink grant may indicate a channel access type to be used among the first type channel access or the second type channel access in the uplink transmission. Preferably, when the at least one subframe is not included in the predetermined interval or only a part of the at least one subframe is included in the predetermined interval, the uplink transmission may be performed using a channel access of a type indicated in the uplink grant.

On the other hand, the predetermined interval may be determined based on a maximum channel occupation time set by the downlink transmission and information on whether the at least one subframe is the last subframe for the uplink transmission is received through a common control channel.

In addition, when the uplink transmission is performed in the next subframe of the downlink transmission in the unlicensed cell, the uplink transmission may be performed using the second type channel access.

On the other hand, according to another aspect of the present invention, provided is a method for receiving an uplink transmission from a user equipment by a base station through an unlicensed cell in a wireless communication system, the method including: scheduling transmission of the uplink signal in at least one subframe and transmitting an uplink grant indicating a channel access type to be used when the user equipment transmits the uplink signal among the first type channel access or the second type channel access to the user equipment; and receiving the uplink signal in the at least one subframe. The method further includes, when all of the at least one subframe is included in a predetermined interval determined based on downlink transmission through the unlicensed cell, transmitting common downlink control information indicating to perform the second type channel access in the uplink transmission.

In addition, according to another aspect of the present invention, provided is a base station in a wireless communication system, the base station including: a wireless communication module; and a processor configured to schedule transmission of an uplink signal through an unlicensed cell in at least one subframe, transmit to a user equipment an uplink grant indicating a channel access type to be used when the user equipment transmits the uplink signal among the first type channel access or the second type channel access, and receive the uplink signal from the user equipment in the at least one subframe, and when all of the at least one subframe is included in a predetermined interval determined based on downlink transmission through the unlicensed cell, the processor is configured to transmit common downlink control information indicating to perform the second type channel access in the uplink transmission.

Additionally, when the at least one subframe is not included in the predetermined interval or only a part of the at least one subframe is included in the predetermined interval, the uplink grant may indicate the first type channel access. Furthermore, the common downlink control information may include information on whether the at least one subframe is the last subframe for the uplink transmission.

Advantageous Effects

According to exemplary embodiments of the present invention, provided are a method for efficiently transmitting a signal in a wireless communication system, in particular, a cellular wireless communication system and an apparatus therefor. Further, provided are a method for efficiently accessing a channel in a specific frequency band (e.g., unlicensed band) and an apparatus therefor.

Effects to be acquired in the present invention are not limited to the aforementioned effects, and other effects not described above will be apparently understood by those skilled in the art from the following disclosure.

DESCRIPTION OF DRAWINGS

In order to help understand the present invention, the accompanying drawings which are included as a part of the Detailed Description provide embodiments of the present invention and describe the technical matters of the present invention together with the Detailed Description.

MODE FOR CARRYING OUT THE INVENTION

Terms used in the specification adopt general terms which are currently widely used as possible by considering functions in the present invention, but the terms may be changed depending on an intention of those skilled in the art, customs, and emergence of new technology. Further, in a specific case, there is a term arbitrarily selected by an applicant and in this case, a meaning thereof will be described in a corresponding description part of the invention. Accordingly, it intends to be revealed that a term used in the specification should be analyzed based on not just a name of the term but a substantial meaning of the term and contents throughout the specification.

Throughout this specification and the claims that follow, when it is described that an element is "coupled" to another element, the element may be "directly coupled" to the other element or "electrically coupled" to the other element through a third element. Further, unless explicitly described to the contrary, the word "comprise" and variations such as "comprises" or "comprising", will be understood to imply the inclusion of stated elements but not the exclusion of any other elements. Moreover, limitations such as "equal to or more than" or "equal to or less than" based on a specific threshold may be appropriately substituted with "more than" or "less than", respectively in some exemplary embodiments.

The following technology may be used in various wireless access systems, such as code division multiple access (CDMA), frequency division multiple access (FDMA), time division multiple access (TDMA), orthogonal frequency division multiple access (OFDMA), single carrier-FDMA (SC-FDMA), and the like. The CDMA may be implemented by a radio technology such as universal terrestrial radio access (UTRA) or CDMA2000. The TDMA may be implemented by a radio technology such as global system for mobile communications (GSM)/general packet radio service (GPRS)/enhanced data rates for GSM evolution (EDGE). The OFDMA may be implemented by a radio technology such as IEEE 802.11 (Wi-Fi), IEEE 802.16 (WiMAX), IEEE 802-20, evolved UTRA (E-UTRA), and the like. The UTRA is a part of a universal mobile telecommunication system (UMTS). $3^{rd}$ generation partnership project (3GPP) long term evolution (LTE) is a part of an evolved UMTS (E-UMTS) using evolved-UMTS terrestrial radio access (E-UTRA) and LTE-advanced (A) is an evolved version of the 3GPP LTE. 3GPP LTE/LTE-A is primarily described for clear description, but technical spirit of the present invention is not limited thereto.

Figure 1:
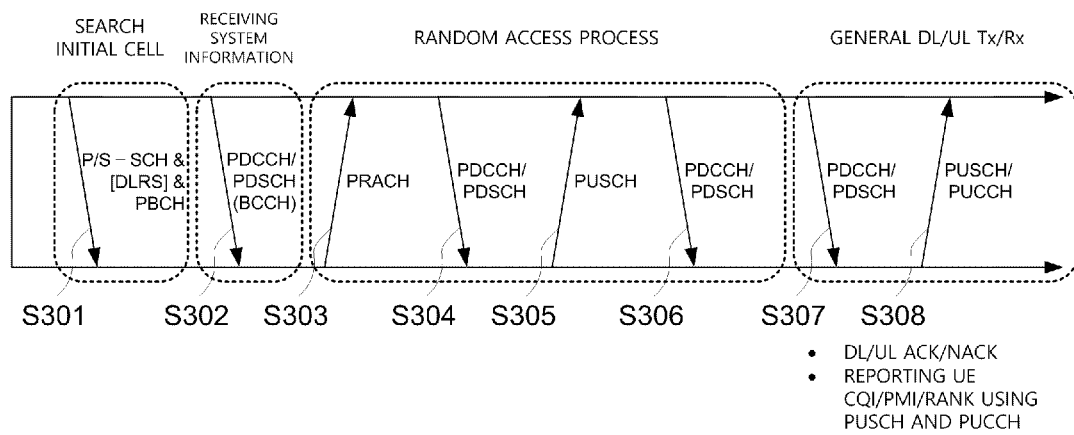
FIG. 1 illustrates physical channels used in a 3rd generation partnership project (3GPP) system and a general signal transmitting method using the physical channels.

FIG. 1 illustrates physical channels used in a 3GPP system and a general signal transmitting method using the physical channels. An user equipment receives information from a base station through downlink (DL) and the user equipment transmits information through uplink (UL) to the base station. The information transmitted/received between the base station and the user equipment includes data and various control information and various physical channels exist according to a type/purpose of the information transmitted/received between the base station and the user equipment.

When a power of the user equipment is turned on or the user equipment newly enters a cell, the user equipment performs an initial cell search operation including synchronization with the base station, and the like (S301). To this end, the user equipment receives a primary synchronization channel (P-SCH) and a secondary synchronization channel (S-SCH) from the base station to synchronize with the base station and obtain information including a cell ID, and the like. Thereafter, the user equipment receives a physical broadcast channel from the base station to obtain intra-cell broadcast information. The user equipment receives a downlink reference signal (DL RS) in an initial cell search step to verify a downlink channel state.

The user equipment that completes initial cell search receives a physical downlink control channel (PDCCH) and a physical downlink shared channel (PDSCH) depending on information loaded on the PDCCH to obtain more detailed system information (S302).

When there is no radio resource for initially accessing the base station or signal transmission, the user equipment may perform a random access procedure (RACH procedure) to the base station (S303 to S306). To this end, the user equipment may transmit a preamble through a physical random access channel (PRACH) (S303) and receive a response message to the preamble through the PDCCH and the PDSCH corresponding thereto (S304). In the case of a contention based RACH, a contention resolution procedure may be additionally performed.

Thereafter, the user equipment may receive the PDCCH/PDSCH (S307) and transmit a physical uplink shared channel (PUSCH)/physical uplink control channel (PUCCH) (S308) as a general procedure. The user equipment receives downlink control information (DCI) through the PDCCH. The DCI includes control information such as resource allocation information to the user equipment and a format varies depending on a use purpose. The control information which the user equipment transmits to the base station is designated as uplink control information (UCI). The UCI includes an acknowledgement/negative acknowledgement (ACK/NACK), a channel quality indicator (CQI), a precoding matrix index (PMI), a rank indicator (RI), and the like. The UCI may be transmitted through the PUSCH and/or PUCCH.

Figure 2:
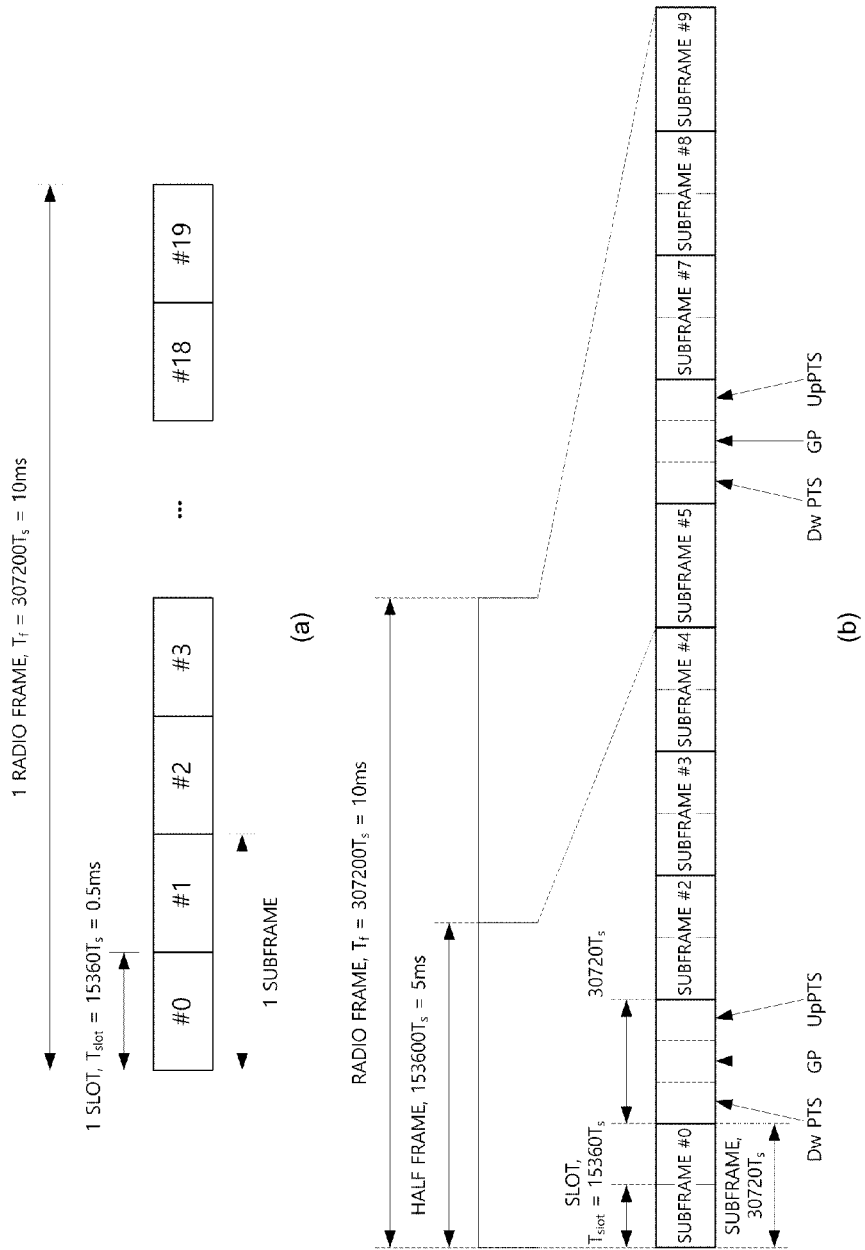
FIG. 2 illustrates one example of a radio frame structure used in a wireless communication system.

FIG. 2 illustrates one example of a radio frame structure used in a wireless communication system. FIG. 2A illustrates a frame structure for frequency division duplex (FDD) and FIG. 2B illustrates a frame structure for time division duplex (TDD).

Referring to FIG. 2, a radio frame may have a length of 10 ms (307200 Ts) and be constituted by 10 subframes (SFs). Ts represents a sampling time and is expressed as Ts=1/(2048*15 kHz). Each subframe may have a length of 1 ms and be constituted by 2 slots. Each slot has a length of 0.5 ms. A time for transmitting one subframe is defined as a transmission time interval (TTI). A time resource may be distinguished by radio frame numbers/indexes, subframe numbers/indexes #0 to #9, and slot numbers/indexes #0 to #19.

The radio frame may be configured differently according to a duplex mode. In an FDD mode, downlink transmission and uplink transmission are distinguished by a frequency and the radio frame includes only one of a downlink subframe and an uplink subframe with respect to a specific frequency band. In a TDD mode, the downlink transmission and the uplink transmission are distinguished by a time and the radio frame includes both the downlink subframe and the uplink subframe with respect to a specific frequency band.

Figure 3:
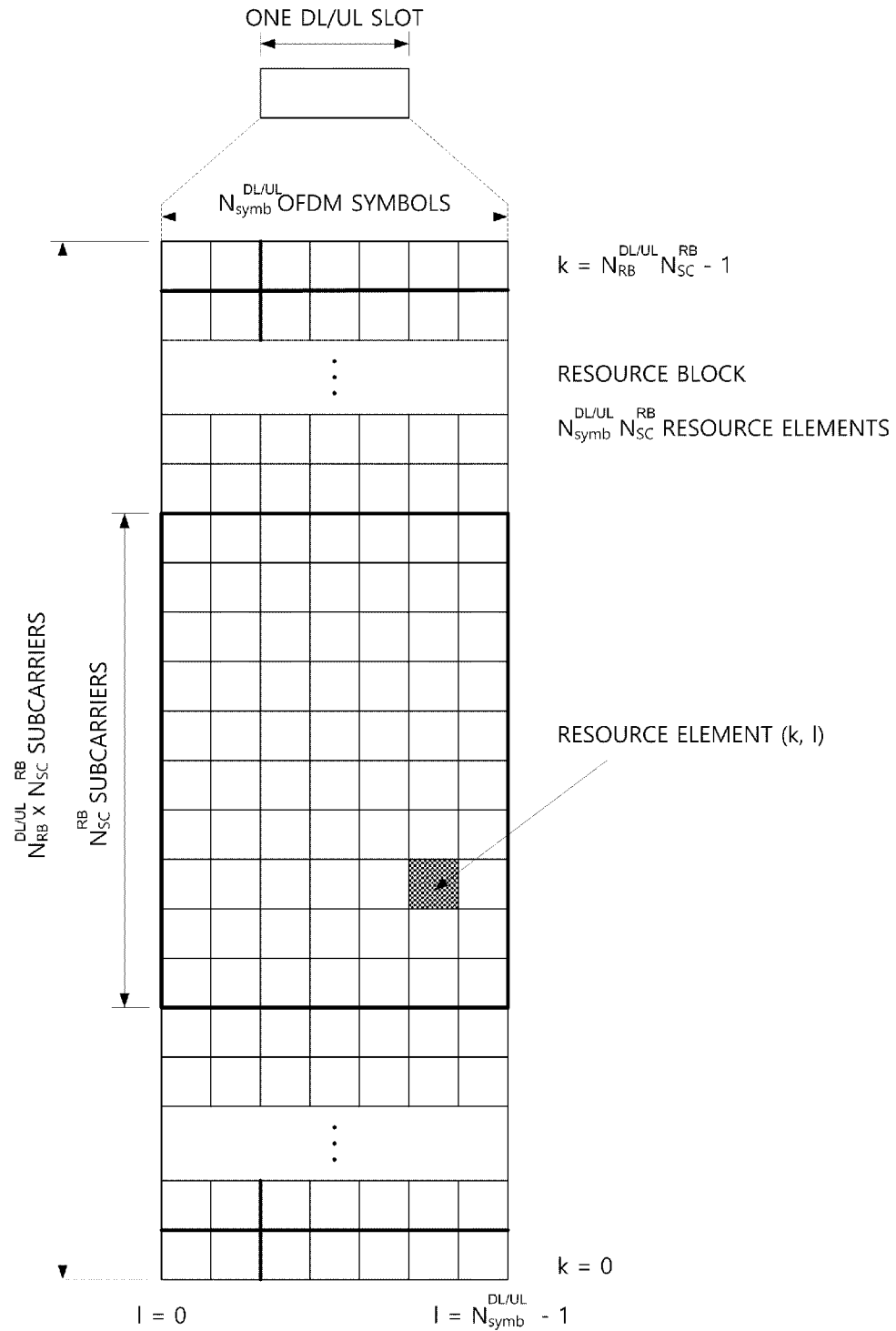
FIG. 3 illustrates one example of a downlink (DL)/uplink (UL) slot structure in the wireless communication system.

FIG. 3 illustrates a structure of a downlink/uplink slot.

Referring to FIG. 3, the slot includes a plurality of orthogonal frequency divisional multiplexing (OFDM) symbols in a time domain and a plurality of resource blocks (RBs) in a frequency domain. The OFDM symbol also means one symbol period. The OFDM symbol may be called an OFDMA symbol, a single carrier frequency division multiple access (SC-FDMA) symbol, or the like according to a multi-access scheme. The number of OFDM symbols included in one slot may be variously modified according to the length of a cyclic prefix (CP). For example, in the case of a normal CP, one slot includes 7 OFDM symbols and in the case of an extended CP, one slot includes 6 OFDM symbols. The RB is defined as $N^{DL/UL}_{symb}$ (e.g., 7) continuous OFDM symbols in the time domain and $N^{RB}_{sc}$ (e.g., 12) continuous subcarriers in the frequency domain. A resource constituted by one OFDM symbol and one subcarrier is referred to as a resource element (RE) or a tone. One RB is constituted by $N^{DU/UL}_{symb}*N^{RB}_{sc}$ resource elements.

The resource of the slot may be expressed as a resource grid constituted by $N^{DL/UL}_{RB}*NR^{RB}_{sc}$ subcarriers and $N^{DL/UL}_{symb}$ OFDM symbols. Each RE in the resource grid is uniquely defined by an index pair (k, 1) for each slot. k represents an index given with 0 to $N^{DL/UL}_{RB}*N^{RB}_{sc}-1$ in the frequency domain and 1 represents an index given with 0 to $N^{DL/UL}_{symb}-1$ in the time domain. Herein, $N^{DL}_{RB}$ represents the number of resource blocks (RBs) in the downlink slot and $N^{UL}_{RB}$ represents the number of RBs in the UL slot. $N^{DL}_{RB}$ and $N^{UL}_{RB}$ depend on a Downlink transmission bandwidth and a Uplink transmission bandwidth, respectively. $N^{DL}_{symb}$ represents the number of symbols in the downlink slot and $N^{UL}_{symb}$ represents the number of symbols in the UL slot. $N^{RB}_{sc}$ represents the number of subcarriers constituting one RB. One resource grid is provided per antenna port.

Figure 4:
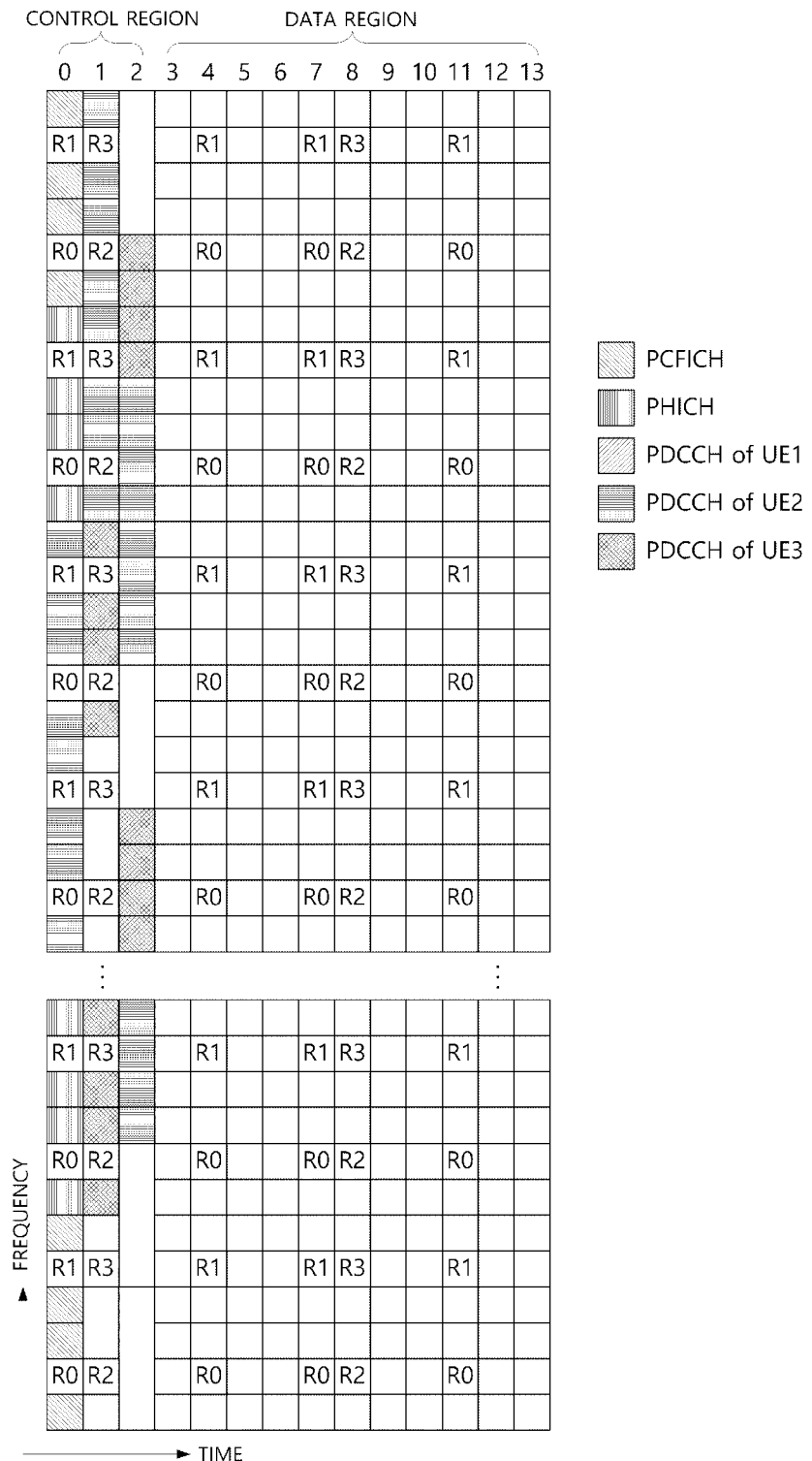
FIG. 4 illustrates a structure of a downlink subframe (SF).

FIG. 4 illustrates a structure of a downlink subframe.

Referring to FIG. 4, the subframe may be constituted by 14 OFDM symbols. First 1 to 3 (alternatively, 2 to 4) OFDM symbols are used as a control region and the remaining 13 to 11 (alternatively, 12 to 10) OFDM symbols are used as a data region according to subframe setting. R1 to R4 represent reference signals for antenna ports 0 to 3. Control channels allocated to the control region include a physical control format indicator channel (PCFICH), a physical hybrid-ARQ indicator channel (PHICH), a physical downlink control channel (PDCCH), and the like. Data channels allocated to the data region include the PDSCH, and the like. When an enhanced PDCCH (EPDCCH) is set, the PDSCH and the EPDCCH are multiplexed by frequency division multiplexing (FDM) in the data region.

The PDCCH as the physical downlink control channel is allocated to first n OFDM symbols of the subframe. n as an integer of 1 (alternatively, 2) or more is indicated by the PCFICH. The PDCCH announces information associated with resource allocation of a paging channel (PCH) and a downlink-shared channel (DL-SCH) as transmission channels, an uplink scheduling grant, HARQ information, and the like to each user equipment or user equipment group. Data (that is, transport block) of the PCH and the DL-SCH are transmitted through the PDSCH. Each of the base station and the user equipment generally transmit and receive data through the PDSCH except for specific control information or specific service data.

Information indicating to which user equipment (one or a plurality of user equipments) the data of the PDSCH is transmitted, information indicating how the user equipments receive and decode the PDSCH data, and the like are transmitted while being included in the PDCCH/EPDCCH. For example, it is assumed that the PDCCH/EPDCCH is CRC-masked with a radio network temporary identity (RNTI) called "A" and information regarding data transmitted by using a radio resource (e.g., frequency location) called "B" and a DCI format called "C", that is, transmission format information (e.g., transport block size, modulation scheme, coding information, and the like) is transmitted through a specific subframe. In this case, a user equipment in the cell monitors the PDCCH/EPDCCH by using the RNTI information thereof and when one or more user equipments having the "A" RNTI are provided, the user equipments receive the PDCCH/EPDCCH and receive the PDSCH indicated by "B" and "C" through information on the received PDCCH/EPDCCH.

Figure 5:
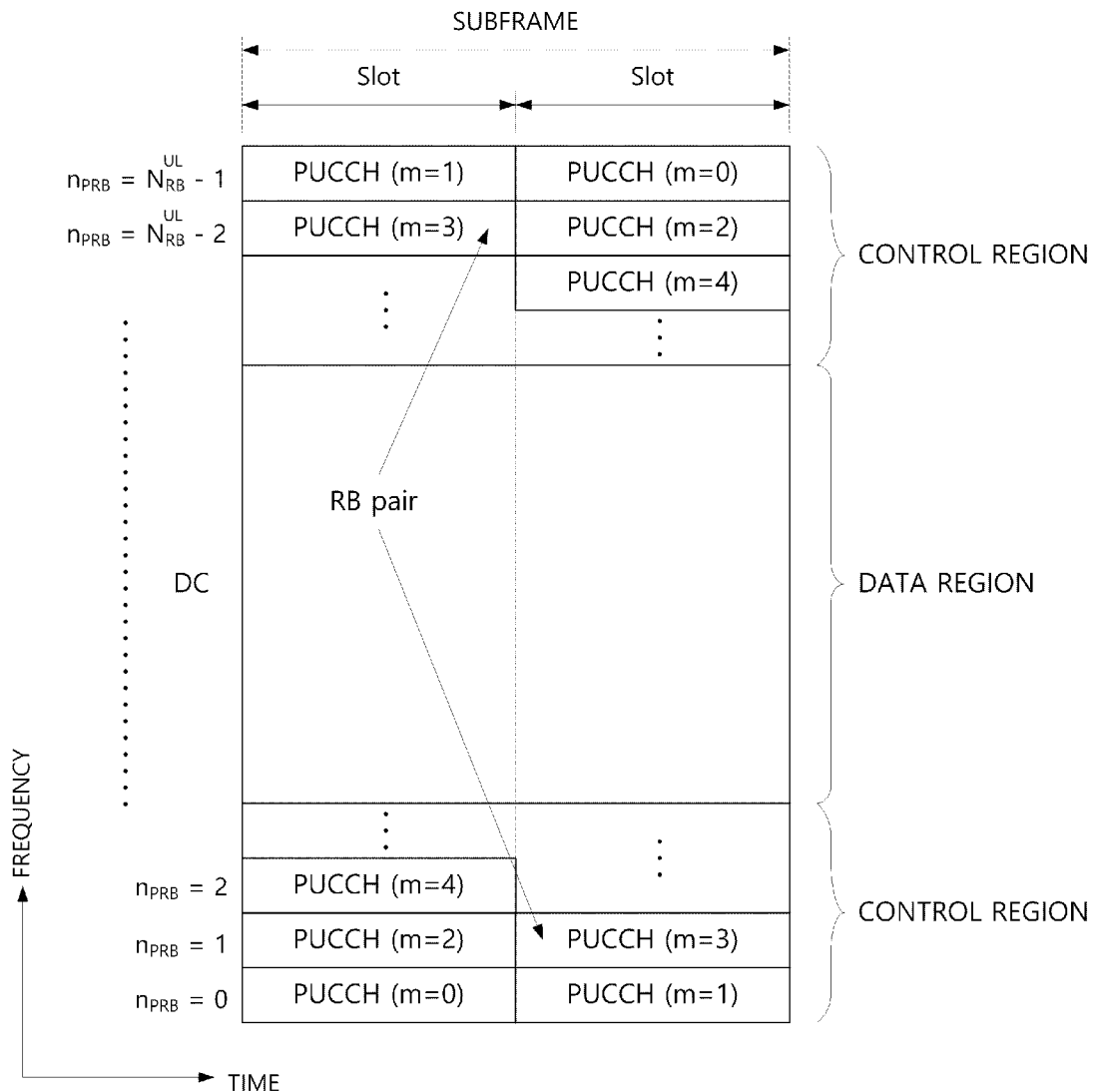
FIG. 5 illustrates a structure of an uplink subframe.

FIG. 5 illustrates a structure of an uplink subframe.

Referring to FIG. 5, the subframe may be divided into the control region and the data region in the frequency domain. The PUCCH is allocated to the control region and carries the UCI. The PUSCH is allocated to the data region and carries user data.

The PUCCH may be used to transmit the following control information.

Scheduling Request (SR): Information used to request a UL-SCH resource. The SR is transmitted by using an on-off keying (OOK) scheme.

HARQ-ACK: Response to the PDCCH and/or response to a downlink data packet (e.g., codeword) on the PDSCH. The codeword is an encoded format of the transport block. The HARQ-ACK indicates whether the PDCCH or PDSCH is successfully received. The HARQ-ACK response includes a positive ACK (simply, ACK), a negative ACK (NACK), discontinuous transmission (DTX), or the NACK/DTX. The DTX represents a case in which the user equipment misses the PDCCH (alternatively, semi-persistent scheduling (SPS) PDSCH) and the NACK/DTX means the NACK or DTX. The HARQ-ACK is mixedly used with the HARQ-ACK/NACK and the ACK/NACK.

Channel State Information (CST): Feed-back information regarding the downlink channel. Multiple input multiple output (MIMO) related feed-back information includes the RI and the PMI.

Hereinafter, carrier aggregation will be described. The carrier aggregation means a method in which the wireless communication system uses a plurality of frequency blocks as one large logical frequency band in order to use a wider frequency band. When a whole system band is extended by the carrier aggregation, a frequency band used for communication with each user equipment is defined by a component carrier (CC) unit.

Figure 6:
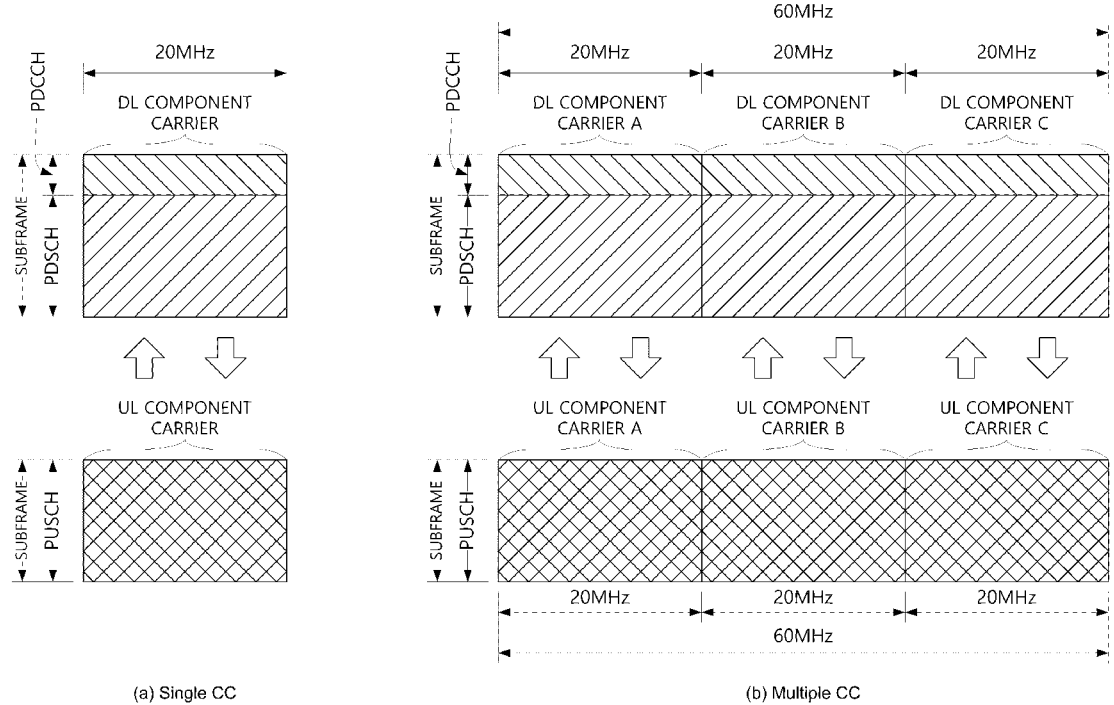
FIG. 6 is a diagram for describing single carrier communication and multi-carrier communication.

FIG. 6 is a diagram for describing single carrier communication and multi-carrier communication. FIG. 6A illustrates a subframe structure of a single carrier and FIG. 6B illustrates a subframe structure of multi-carriers which are carrier-aggregated.

Referring to FIG. 6A, in a single carrier system, the base station and the user equipment perform data communication through one DL band and one UL band corresponding thereto. The DL/UL band is divided into a plurality of orthogonal subcarriers and each frequency band operates at one carrier frequency. In the FDD, the DL and UL bands operate at different carrier frequencies, respectively and in the TDD, the DL and UL bands operate at the same carrier frequency. The carrier frequency means a center frequency of the frequency band.

Referring to FIG. 6B, the carrier aggregation is distinguished from an OFDM system that performs DL/UL communication in a base frequency band divided into a plurality of subcarriers by using one carrier frequency, in that the carrier aggregation performs DL/UL communication by using a plurality of carrier frequencies. Referring to FIG. 6B, three 20 MHz CCs are gathered in each of the UL and the DL to support a bandwidth of 60 MHz. The CCs may be adjacent to each other or non-adjacent to each other in the frequency domain. For convenience, FIG. 6B illustrates a case in which a bandwidth of a UL CC and a bandwidth of a DL CC are the same as each other and symmetric to each other, but the bandwidths of the respective CCs may be independently decided. Further, asymmetric carrier aggregation in which the number of UL CCs and the number of DL CCs are different from each other is also available. The DL/UL CC(s) are independently allocated/configured for each user equipment and the DL/UL CC(s) allocated/configured to the user equipment are designated as serving UL/DL CC(s) of the corresponding user equipment.

The base station may activate some or all of serving CCs of the user equipment or deactivate some CCs. When the base station allocates the CC(s) to the user equipment, if the CC allocation to the user equipment is wholly reconfigured or if the user equipment does not hand over, at least one specific CC among the CC(s) configured with respect to the corresponding user equipment is not deactivated. A specific CC which is always activated is referred to as a primary CC (PCC) and a CC which the base station may arbitrarily activate/deactivate is referred to as a secondary CC (SCC). The PCC and the SCC may be distinguished based on the control information. For example, specific control information may be set to be transmitted/received only through a specific CC and the specific CC may be referred to as the PCC and remaining CC(s) may be referred to as SCC(s). The PUCCH is transmitted only on the PCC.

In 3GPP, a concept of the cell is used in order to manage the radio resource. The cell is defined as a combination of the DL resource and the UL resource, that is, a combination of the DL CC and the UL CC. The cell may be configured by the DL resource only or the combination of the DL resource and the UL resource. When the carrier aggregation is supported, a linkage between the carrier frequency of the DL resource (alternatively, DL CC) and the carrier frequency of the UL resource (alternatively, UL CC) may be indicated by system information. For example, the combination of the DL resource and the UL resource may be indicated by a system information block type 2 (SIB2) linkage. The carrier frequency means a center frequency of each cell or CC. A cell corresponding to the PCC is referred to as the primary cell (PCell) and a cell corresponding to the SCC is referred to as the secondary cell (SCell). A carrier corresponding to the PCell is a DL PCC in the downlink and a carrier corresponding to the PCell is a UL PCC in the uplink. Similarly, a carrier corresponding to the SCell is a DL SCC in the downlink and a carrier corresponding to the SCell is a UL SCC in the uplink. According to a user equipment capability, the serving cell(s) may be constituted by one PCell and 0 or more SCells. For a user equipment which is in an RRC_CONNECTED state, but does not have any configuration for the carrier aggregation or does not support the carrier aggregation, only one serving cell constituted by only the PCell is present.

Figure 7:
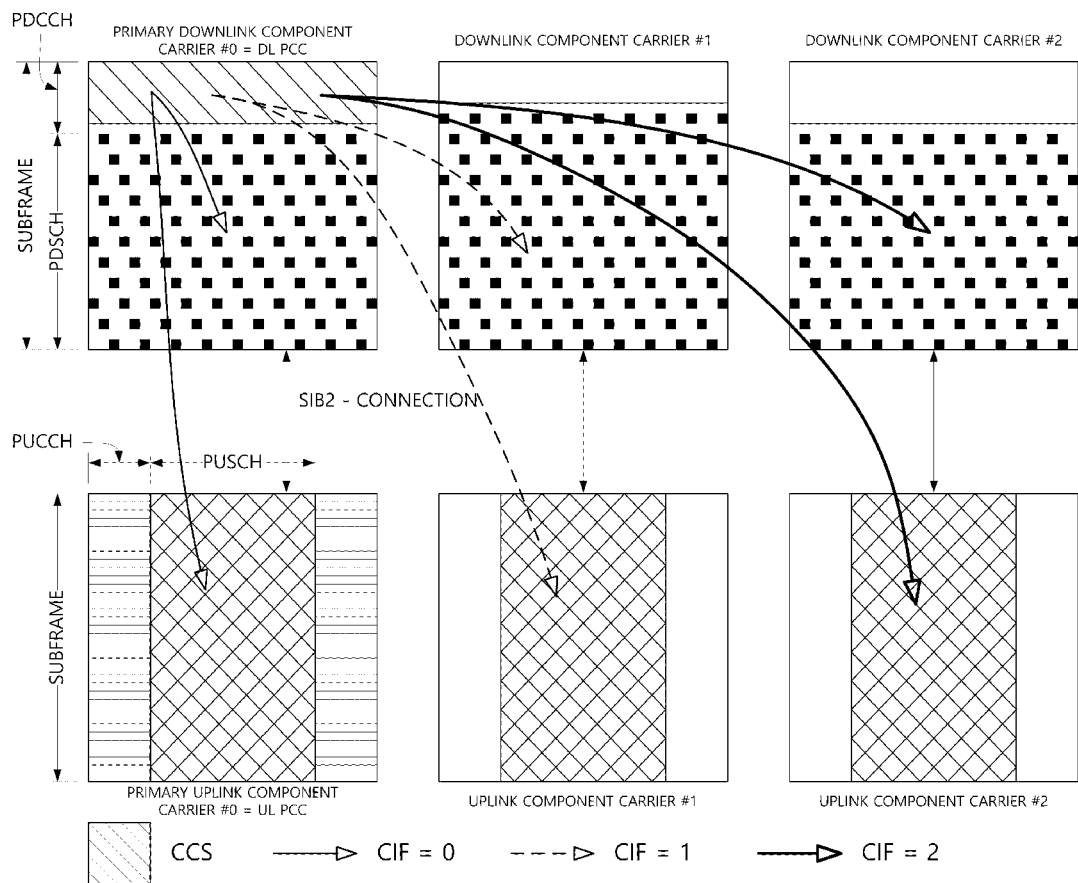
FIG. 7 illustrates an example in which a cross carrier scheduling technique is applied.

FIG. 7 illustrates an example in which cross carrier scheduling is applied. When the cross carrier scheduling is configured, a control channel transmitted through a first CC may schedule a data channel transmitted through the first CC or a second CC by using a carrier indicator field (CIF). The CIF is included in the DCI. In other words, a scheduling cell is configured, and a DL grant/UL grant transmitted in a PDCCH area of the scheduling cell schedules the PDSCH/PUSCH of a scheduled cell. That is, a search space for a plurality of component carriers is present in the PDCCH area of the scheduling cell. The PCell may be basically the scheduling cell and a specific SCell may be designated as the scheduling cell by an upper layer.

In FIG. 7, it is assumed that three DL CCs are aggregated. Herein, DL component carrier #0 is assumed as the DL PCC (alternatively, PCell) and DL component carrier #1 and DL component carrier #2 are assumed as the DL SCC (alternatively, SCell). Further, it is assumed that the DL PCC is set as a PDCCH monitoring CC. When the CIF is disabled, the respective DL CCs may transmit only the PDCCH that schedules the PDSCH thereof without the CIF according to an LTE PDCCH rule (non-cross carrier scheduling or self-carrier scheduling). On the contrary, when the CIF is enabled by UE-specific (alternatively, UE-group-specific or cell-specific) upper layer signaling, a specific CC (e.g., DL PCC) may transmit the PDCCH scheduling the PDSCH of DL CC A and the PDCCH scheduling the PDSCH of another CC by using the CIF (cross-carrier scheduling). On the contrary, in another DL CC, the PDCCH is not transmitted.

Figure 8:
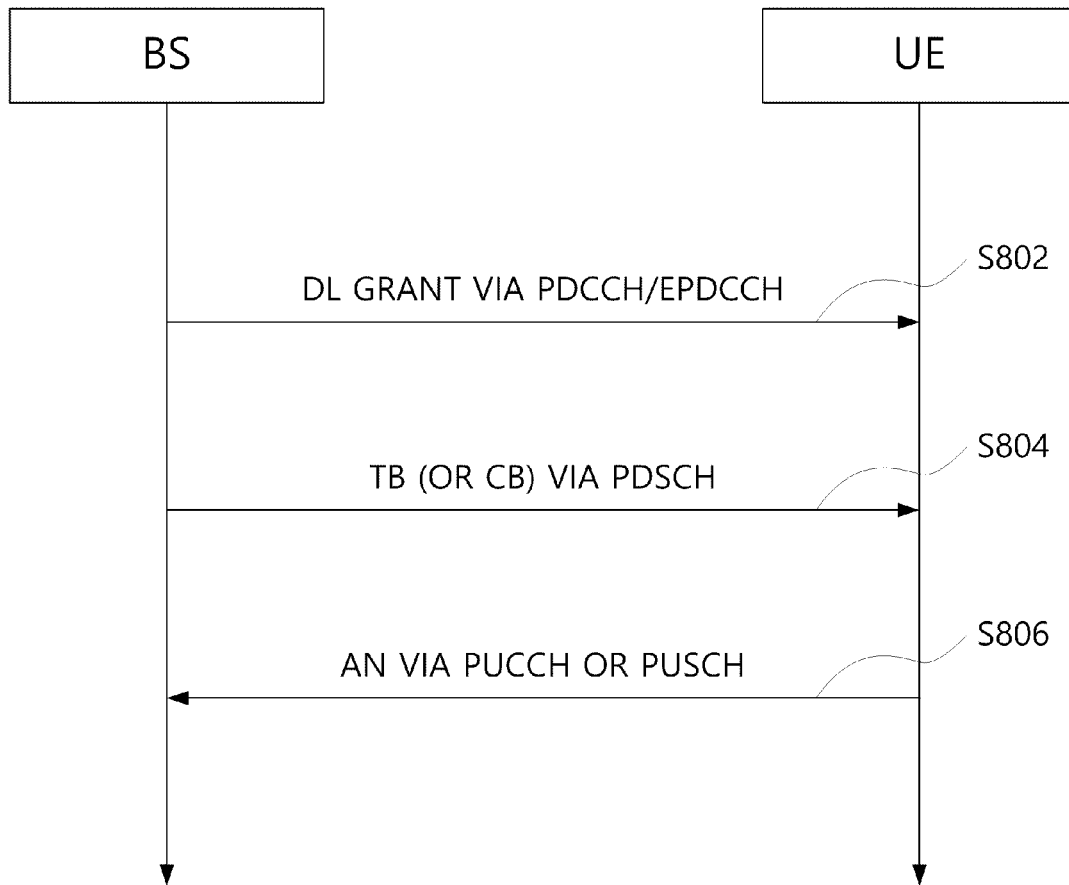
FIG. 8 illustrates an ACK/NACK (A/N) transmission process in a single cell situation.

FIG. 8 illustrates an ACK/NACK (A/N) transmission process in a single cell situation. (i) the PDSCH scheduled by the PDCCH, (ii) the PDSCH without the corresponding PDCCH (i.e., the SPS PDSCH), and (iii) the PDCCH indicating the SPS release. The drawing illustrates the process of transmitting an ACK/NACK for the PDSCH of (i). The PDCCH includes an EPDCCH.

Referring to FIG. 8, the user equipment receives a PDCCH (or EPDCCH) in a subframe #n-k (S802) and receives a PDSCH indicated by a PDCCH in the same subframe (S804). The PDCCH transmits scheduling information (i.e., DL grant), and the PDSCH transmits one or a plurality (e.g., two) of transmission blocks TB (or codewords CW) according to a transmission mode. Thereafter, the user equipment may transmit an ACK/NACK for the PDSCH (i.e., the transmission block) in the subframe #n (S806). In response to a single transmission block, one bit of ACK/NACK may be transmitted and two bits of ACK/NACK may be transmitted in response to two transmission blocks. The ACK/NACK is basically transmitted via the PUCCH, but when there is a PUSCH transmission in subframe #n, the ACK/NACK is transmitted via the PUSCH. k denotes the time interval between the DL subframe and the UL subframe. K=4 in the FDD, and k in the TDD may be given by the Downlink Association Set Index (DASI). ACK/NACK represents HARQ-ACK. The HARQ-ACK response includes ACK, NACK, DTX, and NACK/DTX.

When a plurality of cells is configured to a user equipment, the ACK/NACK information may be transmitted using PUCCH format 3, or may be transmitted using a channel selection scheme based on PUCCH format 1b.

The ACK/NACK payload for PUCCH format 3 is configured per cell and concatenated according to the cell index order. The ACK/NACK payload is configured for all cells configured for the user equipment regardless of whether actual data is transmitted in each cell. Each bit in the ACK/NACK payload represents the HARQ-ACK feedback for that transmission block (or codeword). The HARQ-ACK feedback indicates ACK or NACK, and DTX is processed as NACK. NACK and DTX have the same HARQ-ACK feedback value. If necessary, the base station may distinguish the NACK from the DTX using information on the control channel that the base station has transmitted to the user equipment.

The channel selection scheme based on PUCCH format 1b may be configured for ACK/NACK transmission when two cells are aggregated. In the channel selection scheme based on the PUCCH format 1b, ACK/NACK responses for a plurality of transmission blocks (or codewords) are identified by a combination of a PUCCH resource index and a bit value.

Figure 9:
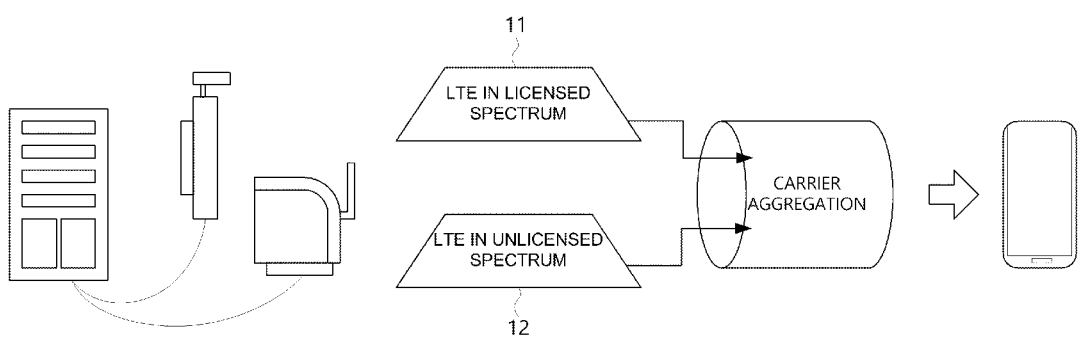
FIG. 9 illustrates a Licensed Assisted Access (LAA) service environment.

FIG. 9 illustrates a Licensed Assisted Access (LAA) service environment.

Referring to FIG. 9, a service environment may be provided to a user, in the service environment, an LTE technology (11) in a conventional licensed band and LTE-unlicensed (LTE-U) or LAA which is an LTE technology (12) in an unlicensed band, which has been actively discussed may be connected to each other. For example, the LTE technology (11) in the licensed band and the LTE technology (12) in the unlicensed band in the LAA environment may be integrated by using a technology such as carrier aggregation, or the like, which may contribute to extension of a network capacity. Further, in an asymmetric traffic structure in which the amount of downlink data is more than that of uplink data, the LAA may provide an optimized LTE service according to various requirements or environments. For convenience, the LTE technology in the licensed (alternatively, authorized or permitted) band is referred to as LTE-licensed (LTE-L) and the LTE technology in the unlicensed (alternatively, unauthorized, non-licensed, license-unnecessary) band is referred to as LTE-unlicensed (LTE-U) or LAA.

Figure 10:
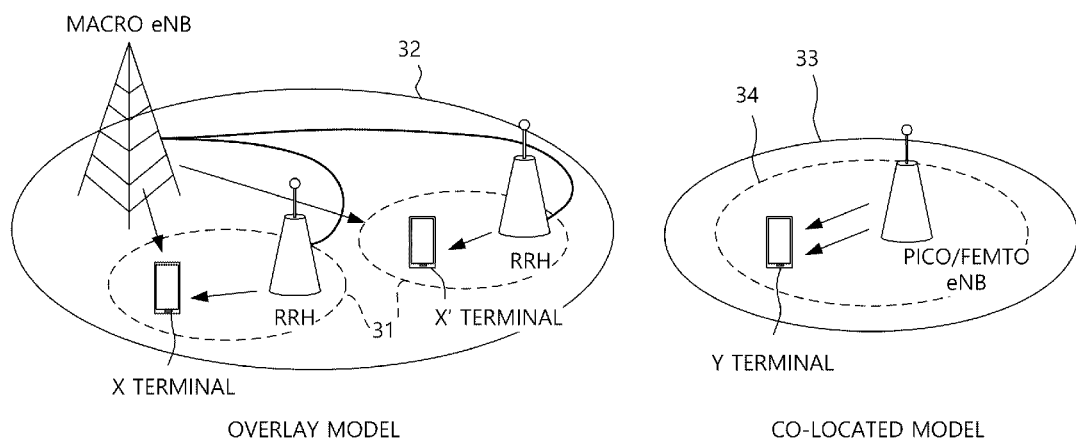
FIG. 10 illustrates a deployment scenario of a user equipment and a base station in an LAA service environment.

FIG. 10 illustrates a layout scenario of a user equipment and a base station in an LAA service environment. A frequency band targeted by the LAA service environment has a short wireless communication reach distance due to a high-frequency characteristic. By considering this, the layout scenario of the user equipment and the base station in an environment in which the conventional LTE-L service and the LAA service coexist may be an overlay model and a co-located model.

In the overlay model, a macro base station may perform wireless communication with an X UE and an X' UE in a macro area (32) by using a licensed carrier and be connected with multiple radio remote heads (RRHs) through an X2 interface. Each RRH may perform wireless communication with an X UE or an X' UE in a predetermined area (31) by using an unlicensed carrier. The frequency bands of the macro base station and the RRH are different from each other not to interfere with each other, but data needs to be rapidly exchanged between the macro base station and the RRH through the X2 interface in order to use the LAA service as an auxiliary downlink channel of the LTE-L service through the carrier aggregation.

In the co-located model, a pico/femto base station may perform the wireless communication with a Y UE by using both the licensed carrier and the unlicensed carrier. However, it may be limited that the pico/femto base station uses both the LTE-L service and the LAA service to downlink transmission. A coverage (33) of the LTE-L service and a coverage (34) of the LAA service may be different according to the frequency hand, transmission power, and the like.

When LTE communication is performed in the unlicensed band, conventional equipments (e.g., wireless LAN (Wi-Fi) equipments) which perform communication in the corresponding unlicensed band may not demodulate an LTE-U message or data and determine the LTE-U message or data as a kind of energy to perform an interference avoidance operation by an energy detection technique. That is, when energy corresponding to the LTE-U message or data is lower than −62 dBm, the wireless LAN equipments may perform communication by disregarding the corresponding message or data. As a result, that user equipment which performs the LTE communication in the unlicensed band may be frequently interfered by the wireless LAN equipments.

Therefore, a specific frequency band needs to be allocated or reserved for a specific time in order to effectively implement an LTE-U technology/service. However, since peripheral equipments which perform communication through the unlicensed hand attempt access based on the energy detection technique, there is a problem in that an efficient LTE-U service is difficult. Therefore, a research into a coexistence scheme with the conventional unlicensed band device and a scheme for efficiently sharing a radio channel needs to be preferentially made in order to settle the LTE-U technology. That is, a robust coexistence mechanism in which the LTE-U device does not influence the conventional unlicensed band device needs to be developed.

Figure 11:
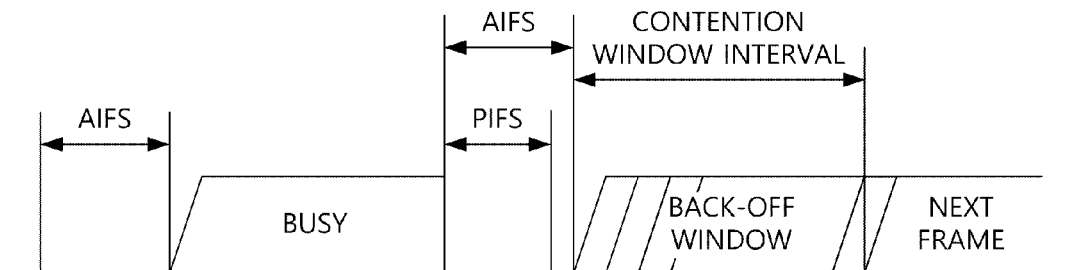
FIG. 11 illustrates a communication scheme (e.g., wireless LAN) that operates in an unlicensed band in the related art.

FIG. 11 illustrates a communication scheme (e.g., wireless LAN) that operates in an unlicensed band in the related art. Since most devices that operate in the unlicensed band operate based on listen-before-talk (LBT), a clear channel assessment (CCA) technique that senses a channel before data transmission is performed.

Referring to FIG. 11, a wireless LAN device (e.g., AP or STA) checks whether the channel is busy by performing carrier sensing before transmitting data. When a predetermined strength or more of radio signal is sensed in a channel to transmit data, it is determined that the corresponding channel is busy and the wireless LAN device delays the access to the corresponding channel. Such a process is referred to as clear channel evaluation and a signal level to decide whether the signal is sensed is referred to as a CCA threshold. Meanwhile, when the radio signal is not sensed in the corresponding channel or a radio signal having a strength smaller than the CCA threshold is sensed, it is determined that the channel is idle.

When it is determined that the channel is idle, a terminal having data to be transmitted performs a back-off procedure after a defer period (e.g., arbitration interframe space (AIFS), PCF IFS (PIFS), or the like). The defer period means a minimum time when the terminal needs to wait after the channel is idle. The back-off procedure allows the terminal to further wait for a predetermined time after the defer period. For example, the terminal stands by while decreasing a slot time for slot times corresponding to a random number allocated to the terminal in the contention window (CW) during the channel is in an idle state, and a terminal that completely exhausts the slot time may attempt to access the corresponding channel.

When the terminal successfully accesses the channel, the terminal may transmit data through the channel. When the data is successfully transmitted, a CW size (CWS) is reset to an initial value (CW min). On the contrary, when the data is unsuccessfully transmitted, the CWS increases twice. As a result, the terminal is allocated with a new random number within a range which is twice larger than a previous random number range to perform the back-off procedure in a next CW. In the wireless LAN, only an ACK is defined as receiving response information to the data transmission. Therefore, when the ACK is received with respect to the data transmission, the CWS is reset to the initial value and when feed-back information is not received with respect to the data transmission, the CWS increases twice.

As described above, since most communications in the unlicensed hand in the related art operate based on the LBT, the LTE also considers the LBT in the LAA for coexistence with the conventional device. In detail, in the LTE, the channel access method on the unlicensed band may be divided into 4 following categories according to the presence/an application scheme of the LBT.

(1) Category 1: No LBT

An LBT procedure by a Tx entity is not performed.

(2) Category 2: LBT without Random Back-Off

A time interval in which the channel needs to be sensed in an idle state before the Tx entity performs a transmission on the channel is decided. The random back-off is not performed. This may be referred to as a Type 2 channel access.

(3) Category 3: LBT with Random Back-Off with a CW of Fixed Size

LBT method that performs random back-off by using a CW of a fixed size. The Tx entity has a random number N in the CW and the CW size is defined by a minimum/maximum value of N. The CW size is fixed. The random number N is used to decide the time interval in which the channel needs to be sensed in an idle state before the Tx entity performs a transmission on the channel.

(4) Category 4: LBT with Random Back-Off with a CW of Variable Size

LBT method that performs the random back-off by using a CW of a variable size. The Tx entity has the random number N in the CW and the CW size is defined by the minimum/maximum value of N. The Tx entity may change the CW size at the time of generating the random number N. The random number N is used to decide the time interval in which the channel needs to be sensed in an idle state before the Tx entity performs a transmission on the channel. This may be referred to as a Type 1 channel access.

Figure 12:
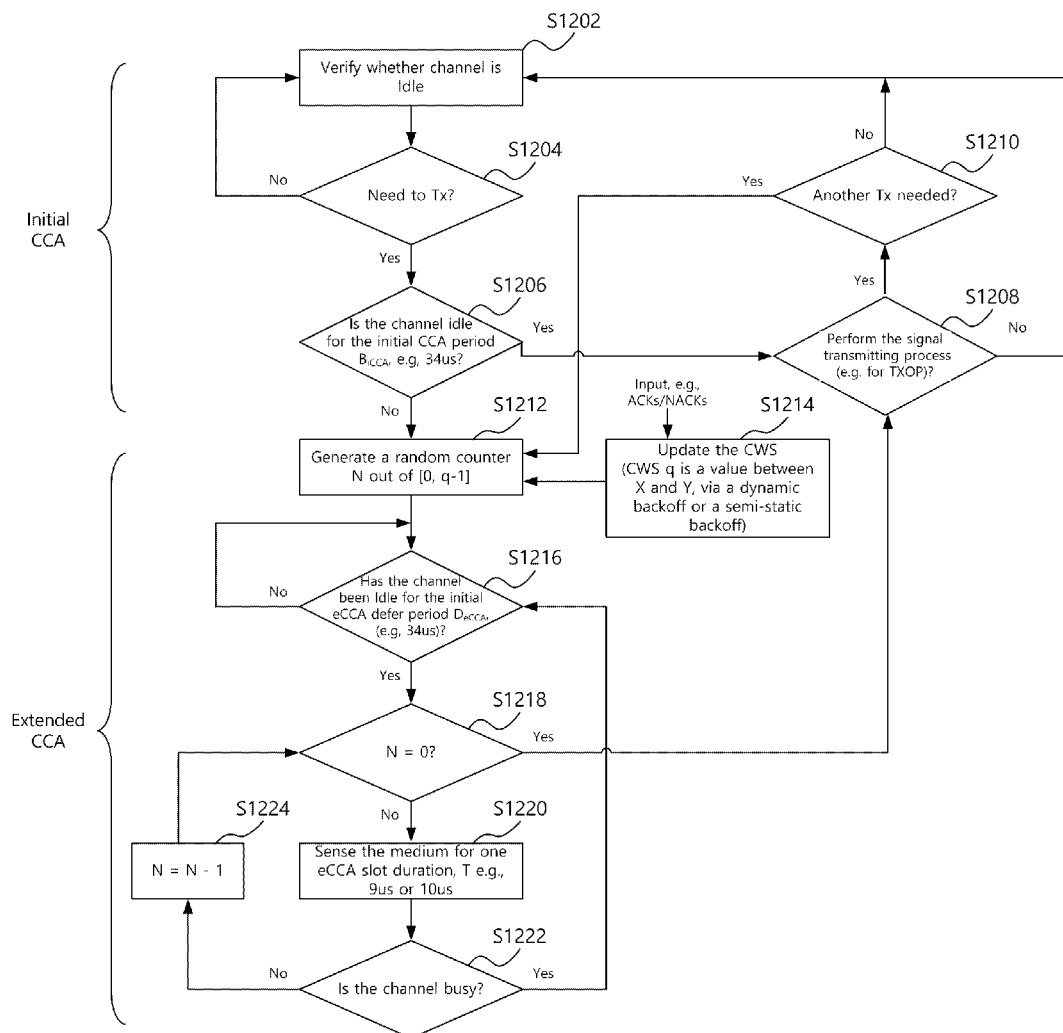
FIGS. 12 to 13 illustrate a Listen-Before-Talk (LBT) procedure for downlink transmission.
Figure 13:
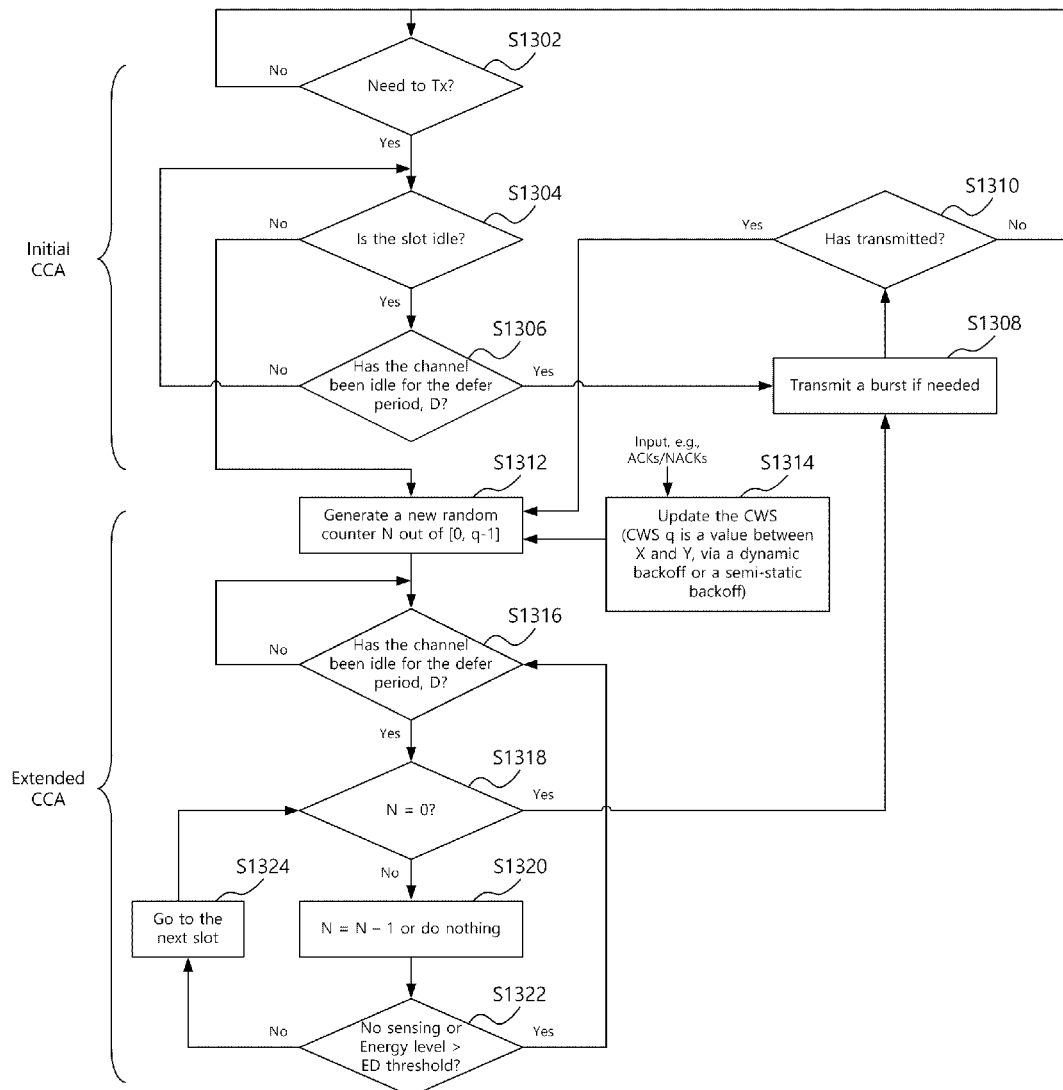

FIGS. 12 and 13 illustrate a downlink transmission process based on the category 4 LBT. The category 4 LBT may be used to guarantee fair channel access with Wi-Fi. Referring to FIGS. 12 and 13, the LBT process includes initial CCA (ICCA) and extended CCA (ECCA). In the ICCA, the random back-off is not performed and in the ECCA, the random back-off is performed by using the CW of the variable size. The ICCA is applied to the case in which the channel is idle when signal transmission is required and the ECCA is applied to the case in which the channel is busy when the downlink transmission is performed just before.

Referring to FIG. 12, downlink transmitting process based on the category 4 LBT, the Type 1 channel access may be performed as follows.

Initial CCA

S1202: The base station verifies that the channel is idle.

S1204: The base station verifies whether the signal transmission is required. When the signal transmission is not required, the process returns to S1202 and when the signal transmission is required, the process proceeds to S1206.

S1206: The base station verifies whether the channel is idle for an ICCA defer period ($B_{CCA}$). The ICCA defer period is configurable. As an implementation example, the ICCA defer period may be constituted by an interval of 16 μs and n consecutive CCA slots. Herein, n may be a positive integer and one CCA slot interval may be 9 μs. The number of CCA slots may be configured differently according to a QoS class. The ICCA defer period may be set to an appropriate value by considering a defer period (e.g., DIFS or AIFS) of Wi-Fi. For example, the ICCA defer period may be 34 us. When the channel is idle for the ICCA defer period, the base station may perform the signal transmitting process (S1208). When it is determined that the channel is busy during the ICCA defer period, the process proceeds to S1212 (ECCA).

S1208: The base station may perform the signal transmitting process. When the signal transmission is not performed, the process proceeds to S1202 (ICCA) and when the signal transmission is performed, the process proceeds to S1210. Even in the case where a back-off counter N reaches 0 in S1218 and S1208 is performed, when the signal transmission is not performed, the process proceeds to S1202 (ICCA) and when the signal transmission is performed, the process proceeds to S1210.

S1210: When additional signal transmission is not required, the process proceeds to S1202 (ICCA) and when the additional signal transmission is required, the process proceeds to S1212 (ECCA).

Extended CCA

S1212: The base station generates the random number N in the CW. N is used as a counter during the back-off process and generated from [0, q−1]. The CW may be constituted by q ECCA slots and an ECCA slot size may be 9 μs or 10 μs. The CW size (CWS) may be defined as q and be variable in S1214. Thereafter, the base station proceeds to S1216.

S1214: The base station may update the CWS. The CWS q may be updated to a value between X and Y. The X and Y values are configurable parameters. CWS update/adjustment may be performed whenever N is generated (dynamic back-off) and semi-statically performed at a predetermined time interval (semi-static back-off). The CWS may be updated/adjusted based on exponential back-off or binary back-off. That is, the CWS may be updated/adjusted in the form of the square of 2 or the multiple of 2. In association with PDSCH transmission, the CWS may be updated/adjusted based on feed-back/report (e.g., HARQ ACK/NACK) of the user equipment or updated/adjusted based on base station sensing.

S1216: The base station verifies whether the channel is idle for an ECCA defer period (DeCCA). The ECCA defer period is configurable. As an implementation example, the ECCA defer period may be constituted by an interval of 16 μs and n consecutive CCA slots. Herein, n may be a positive integer and one CCA slot interval may be 9 μs. The number of CCA slots may be configured differently according to the QoS class. The ECCA defer period may be set to the appropriate value by considering the defer period (e.g., DIFS or AIFS) of Wi-Fi. For example, the ECCA defer period may be 34 us. When the channel is idle for the ECCA defer period, the base station proceeds to S1218. When it is determined that the channel is busy during the ECCA defer period, the base station repeats S1216.

S1218: The base station verifies whether N is 0. When N is 0, the base station may perform the signal transmitting process (S1208). In this case, (N=0), the base station may not immediately perform transmission and performs CCA check for at least one slot to continue the ECCA process. When N is not 0 (that is, N>0), the process proceeds to S1220.

S1220: The base station senses the channel during one ECCA slot interval (T). The ECCA slot size may be 9 μs or 10 μs and an actual sensing time may be at least 4 μs.

S1222: When it is determined that the channel is idle, the process proceeds to S1224. When it is determined that the channel is busy, the process returns to S1216. That is, one ECCA defer period is applied again after the channel is idle and N is not counted during the ECCA defer period.

S1224: N is decreased by 1 (ECCA countdown).

FIG. 13 is substantially the same as/similar to the transmitting process of FIG. 12 and is different from FIG. 12 according to an implementation scheme. Therefore, detailed matters may be described with reference to contents of FIG. 12.

S1302: The base station verifies whether the signal transmission is required. When the signal transmission is not required, S1302 is repeated and when the signal transmission is required, the process proceeds to S1304.

S1304: The base station verifies whether the slot is idle. When the slot is idle, the process proceeds to S1306 and when the slot is busy, the process proceeds to S1312 (ECCA). The slot may correspond to the CCA slot in FIG. 12.

S1306: The base station verifies whether the channel is idle for a defer period (D). D may correspond to the ICCA defer period in FIG. 12. When the channel is idle for the defer period, the base station may perform the signal transmitting process (S1308). When it is determined that the channel is busy during the defer period, the process proceeds to S1304.

S1308: The base station may perform the signal transmitting process if necessary.

S1310: When the signal transmission is not performed, the process proceeds to S1302 (ICCA) and when the signal transmission is performed, the process proceeds to S1312 (ECCA). Even in the case where the back-off counter N reaches 0 in S1318 and S1308 is performed, when the signal transmission is not performed, the process proceeds to S1302 (ICCA) and when the signal transmission is performed, the process proceeds to S1312 (ECCA).

Extended CCA

S1312: The base station generates the random number N in the CW. N is used as the counter during the back-off process and generated from [0, q−1]. The CW size (CWS) may be defined as q and be variable in S1314. Thereafter, the base station proceeds to S1316.

S1314: The base station may update the CWS. The CWS q may be updated to the value between X and Y. The X and Y values are configurable parameters. CWS update/adjustment may be performed whenever N is generated (dynamic back-off) and semi-statically performed at a predetermined time interval (semi-static back-off). The CWS may be updated/adjusted based on exponential back-off or binary back-off. That is, the CWS may be updated/adjusted in the form of the square of 2 or the multiple of 2. In association with PDSCH transmission, the CWS may be updated/adjusted based on feed-back/report (e.g., HARQ ACK/NACK) of the user equipment or updated/adjusted based on base station sensing.

S1316: The base station verifies whether the channel is idle for the defer period (D). D may correspond to the ECCA defer period in FIG. 12. D in S1306 and D in S1316 may be the same as each other. When the channel is idle for the defer period, the base station proceeds to S1318. When it is determined that the channel is busy during the defer period, the base station repeats S1316.

S1318: The base station verifies whether N is 0. When N is 0, the base station may perform the signal transmitting process (S1308). In this case, (N=0), the base station may not immediately perform transmission and performs CCA check during at least one slot to continue the ECCA process. When N is not 0 (that is, N>0), the process proceeds to S1320.

S1320: The base station selects one of an operation of decreasing N by 1 (ECCA count-down) and an operation of not decreasing N (self-defer). The self-defer operation may be performed according to implementation/selection of the base station and the base station does not perform sensing for energy detection and not perform even ECCA countdown in the self-defer.

S1322: The base station may select one of the operation not performing sensing for energy detection and the energy detecting operation. When the sensing for the energy detection is not performed, the process proceeds to S1324. When the energy detecting operation is performed, if an energy level is equal to or lower than an energy detection threshold (that is, idle), the process proceeds to S1324. If the energy level is higher than the energy detection threshold (that is, busy), the process returns to S1316. That is, one defer period is applied again after the channel is idle and N is not counted during the defer period.

S1324: The process proceeds to S1318.

Figure 14:
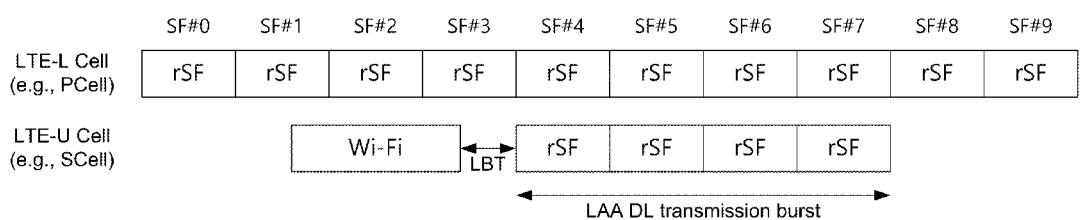
FIG. 14 illustrates downlink transmission in unlicensed band.
Figure 14:
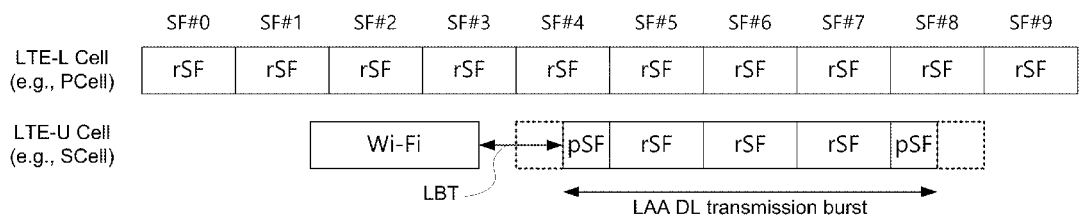

FIG. 14 illustrates an example in which a base station performs downlink transmission in an unlicensed band. The base station may aggregate cells (for convenience, LTE-L cell) of one or more licensed bands and cells (for convenience, LTE-U cell) of one or more unlicensed bands. In FIG. 14, a case in which one LTE-L cell and one LTE-U cell are aggregated for communication with the user equipment is assumed. The LTE-L cell may be the PCell and the LTE-U cell may be the SCell. In the LTE-L cell, the base station may exclusively use the frequency resource and perform an operation depending on LTE in the related art. Therefore, all of the radio frames may be constituted by regular subframes (rSF) having a length of 1 ms (see FIG. 2) and the DL transmission (e.g., PDCCH and PDSCH) may be performed every subframe (see FIG. 1). Meanwhile, in the LTE-U cell, the downlink transmission is performed based on the LBT for coexistence with the conventional device (e.g., Wi-Fi device). Further, a specific frequency band needs to be allocated or reserved for a specific time in order to effectively implement the LTE-U technology/service. Therefore, in the LTE-U cell, the DL transmission may be performed through a set of one or more consecutive subframes (DL transmission burst) after the LBT. The downlink transmission burst may start as the regular subframe (rSF) or a partial subframe (pSF) according to an LBT situation. pSF may be a part of the subframe and may include a second slot of the subframe. Further, the downlink transmission burst may end as rSF or pSF.

<Method of Performing LBT in Uplink Grant Only Transmission>

Hereinafter, when channel access is performed for uplink signal and uplink data transmission through the unlicensed band, a channel access method for performing transmission of a downlink control channel (e.g., PDCCH or EPDCCH) considering uplink grant only (UL grant only) transmission and the uplink grant and the transmission of the uplink traffic scheduled by the uplink grant will be described.

Especially, the present invention intensively explains an LBT method performed for transmission of a downlink control channel considering uplink grant only transmission and uplink traffic transmission scheduled by a corresponding uplink grant.

Figure 15:
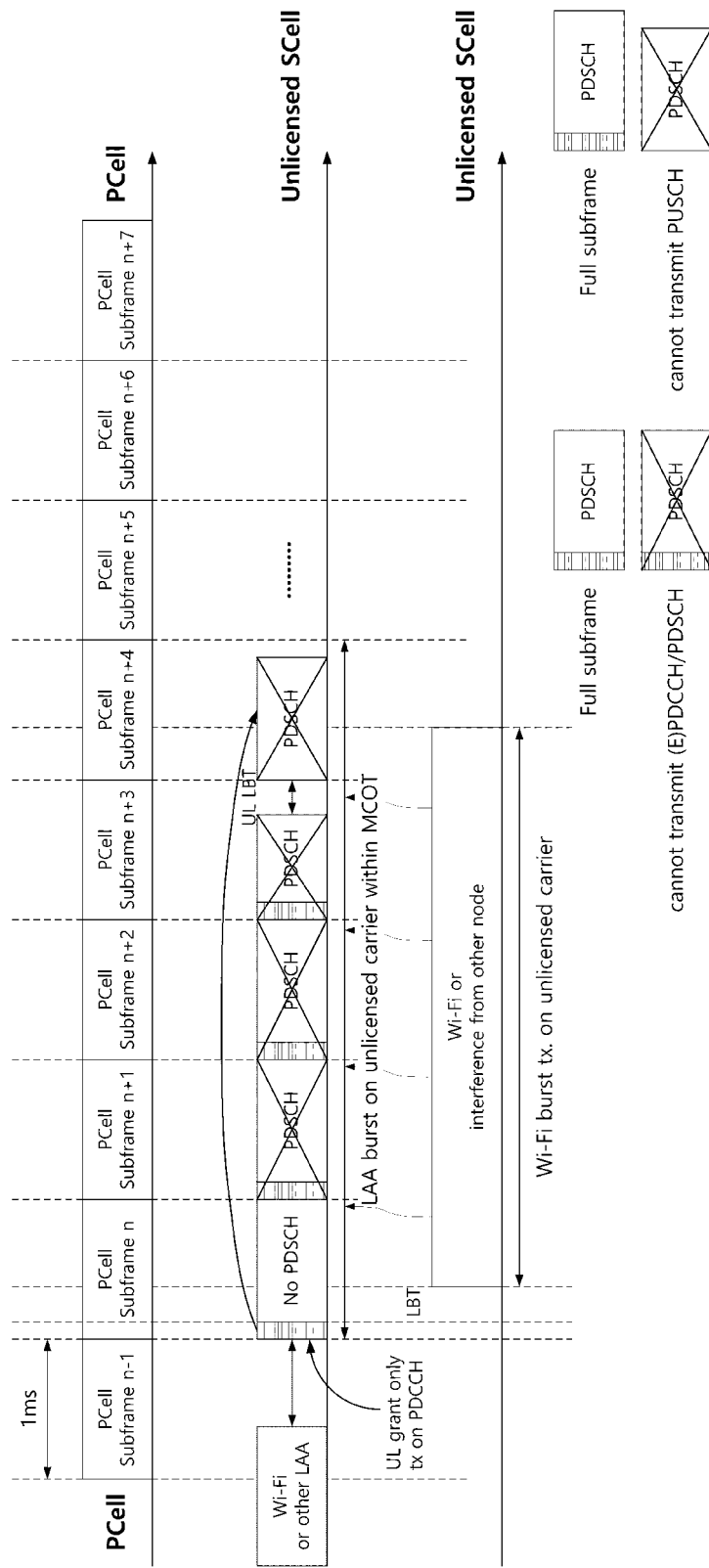
FIG. 15 is a diagram illustrating a case where a PDCCH including only an uplink grant is transmitted without PDSCH transmission as an embodiment of the present invention.

FIG. 15 is a diagram illustrating a case where a PDCCH including only an uplink grant is transmitted without PDSCH transmission as an embodiment of the present invention.

Referring to FIG. 15, when the uplink data traffic transmitted in the LAA SCell is self-carrier-scheduled through the control channel transmitted in the corresponding LAA SCell, a control channel that transmits only the uplink grant may be transmitted in the PDCCH of the DL subframe, that is, the uplink grant only transmission may be performed in the PDCCH without PDSCH transmission in one subframe. In this case, OFDM symbols that the PDSCH region may have in the subframe may be blanked without transmitting any signal, and channel access from other nodes or Wi-Fi nodes may be allowed in the corresponding blanked OFDM symbol(s) of the unlicensed carrier.

Therefore, although the base station attempts to secure the transmission of the base station through configuring the maximum channel occupancy time (MCOT) configuration differently according to the channel access priority class and also the LBT performed for uplink grant only transmission is successful, because of transmission and interference by other nodes due to the fact that the PDSCH transmission does not occur in the corresponding subframe, for transmission of the PDSCH and the scheduled PUSCH in the next subframes, the transmission of the PDSCH and the scheduled PUSCH may be impossible as shown in FIG. 15.

In FIG. 15, a case where the starting subframe of the unlicensed carrier-on-LAA burst is configured as a partial subframe in which the uplink grant only transmission is performed is described as an embodiment, but the present invention is not limited thereto. As another embodiment, there may be a case where the last subframe of the LAA burst is configured as a partial subframe in which uplink grant only transmission is performed. In another embodiment, even in a starting subframe of an LAA burst in an unlicensed carrier or in a subframe that is not the last subframe of the LAA burst, a blanked OFDM symbol may be generated in a subframe in which UL grant only transmission is performed, and accordingly, the above-described problems may occur. Hereinafter, methods for solving the above-mentioned problems will be described.

Method A)

Figure 16:
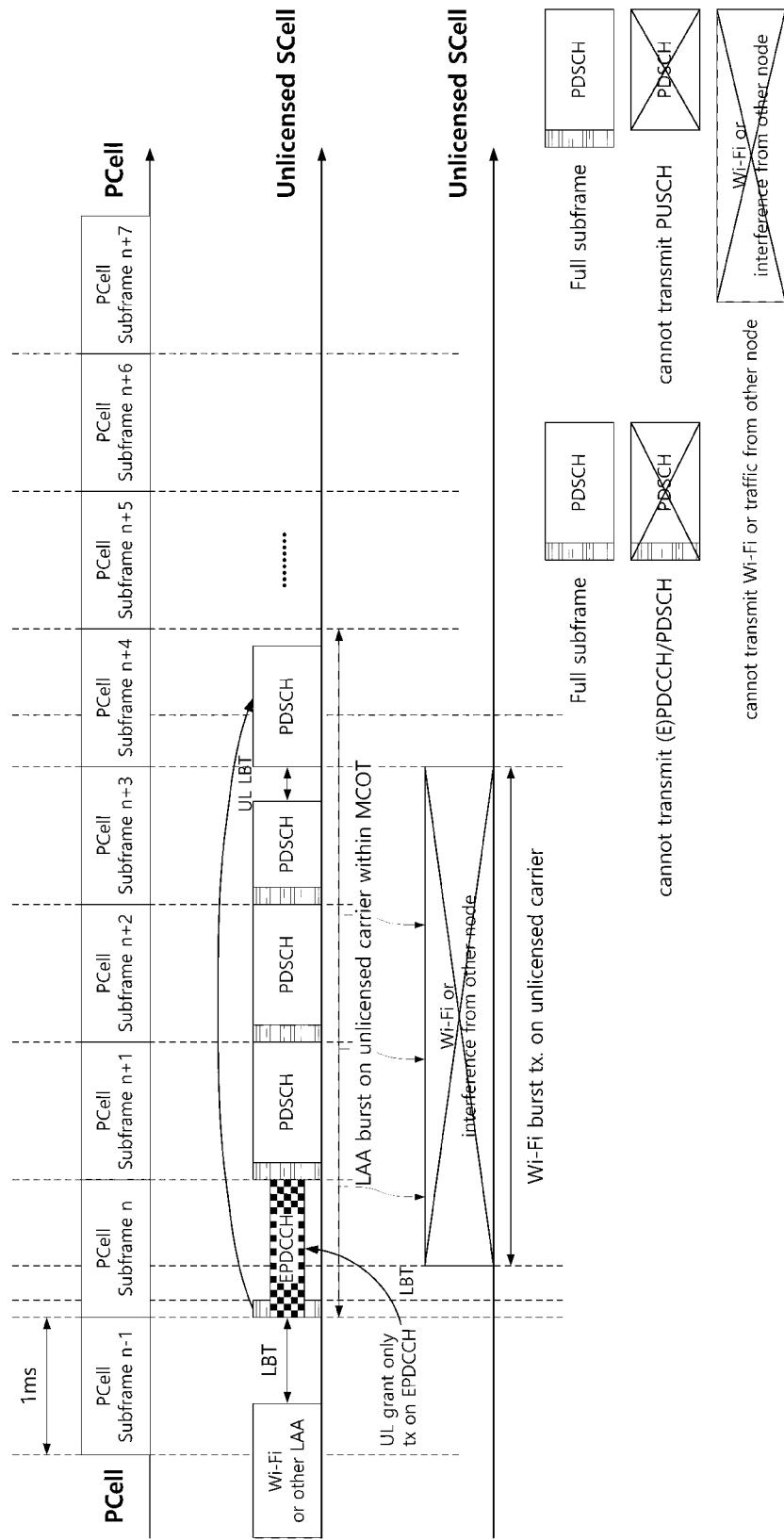
FIG. 16 is a diagram illustrating a case where an EPDCCH including only an uplink grant is transmitted without PDSCH transmission as an embodiment of the present invention.

FIG. 16 illustrates a case of transmitting an EPDCCH including only UL grant without PDSCH transmission. According to this, since the EPDCCH is allocated in the PDSCH region in the FDM scheme with the PDSCH, even if it is a UL grant only transmission without PDSCH, it is possible to prevent occurrence of blanked OFDM symbol(s) in the PDSCH region, and it is possible to prevent channel access by the LBT from other nodes.

Also, as a method for performing an LBT used by UE(s) in transmission of UL traffic corresponding to a corresponding UL grant, by performing the LBT scheme performed during transmission of the UL grant or performing a single interval LBT (hereinafter referred to as a Type 2 channel access for convenience of explanation) such as 16 us, 25 us, 34 us, or 43 us when UL traffic in the MCOT secured in the UL grant transmission is transmitted, it is possible to enable fast channel access for UL data transmission.

Or, as a method for performing an LBT used in a UE(s) in transmission of UL traffic corresponding to an UL grant, by performing the LBT scheme performed during transmission of the UL grant or performing cat-4 LBT (hereinafter referred to as a Type 1 channel access for convenience of explanation) when transmitting UL traffic outside the MCOT obtained during UL grant transmission.

Or, in that case, a method by which the base station signals whether to perform Type 2 channel access to allow the user equipment to have fast channel access as LBT for UL traffic or to perform Type 1 channel access to perform backoff may be considered. The channel access types that the base station may inform the user equipment may be transmitted through the UL grant, and the base station may inform either the Type 1 channel access or the Type 2 channel access in the corresponding UL grant. Here, the Type 1 channel access refers to Cat-4 LBT, and the Type 2 channel access refers to 25 us LBT.

Method B)

Figure 17:
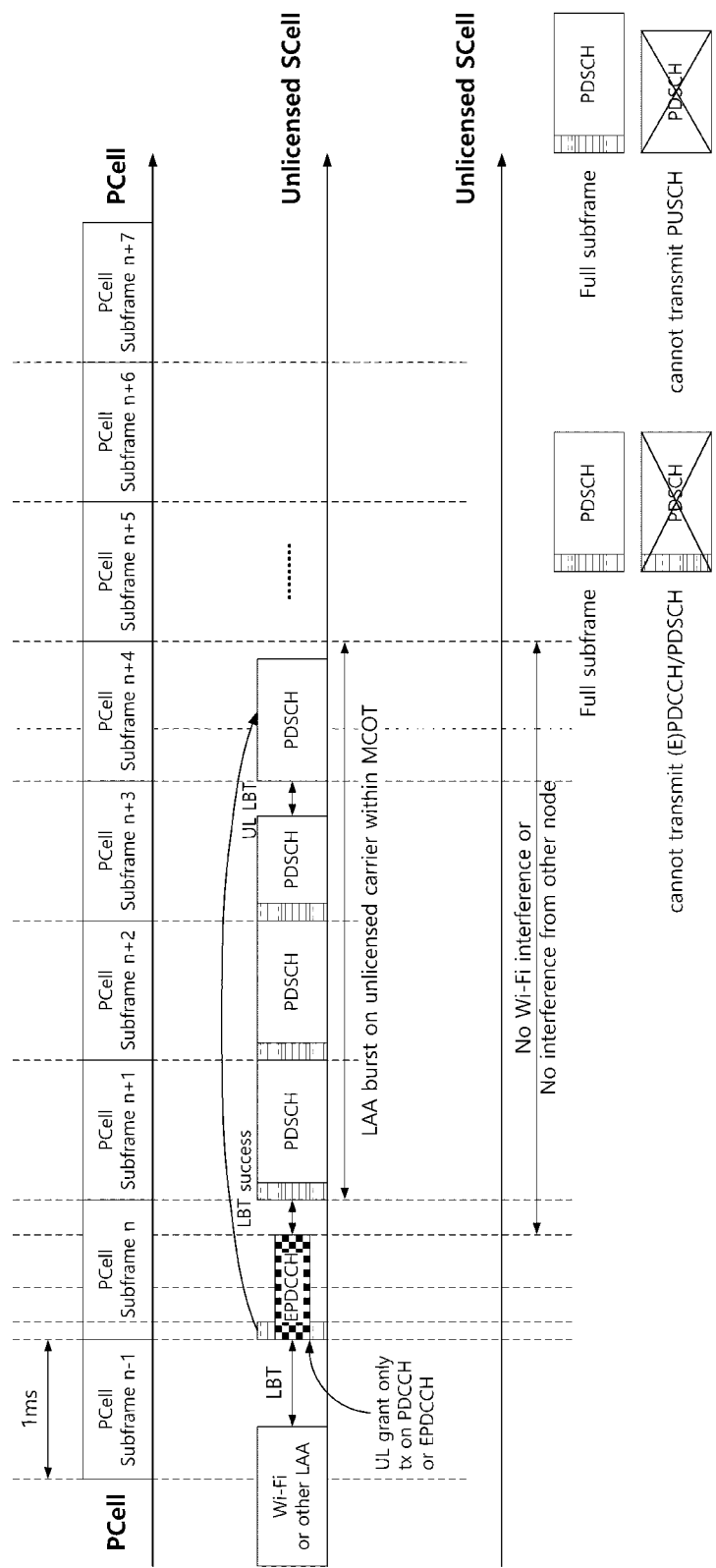
FIG. 17 is a diagram illustrating a case where LBTs for a subframe for transmitting only the UL grant without PDSCH transmission and subframe(s) for performing PDSCH transmission are independently performed according to an embodiment of the present invention.

FIG. 17 is a diagram illustrating a case where LBTs for a subframe for transmitting only the UL grant without PDSCH transmission and subframe(s) for performing PDSCH transmission are independently performed according to an embodiment of the present invention.

As shown in FIG. 17, even when a PDCCH or EPDCCH for UL grant only transmission is transmitted in one subframe, in the next subframe in which the PDSCH is transmitted, being independent of the LBT in the subframe for UL grant only transmission, a method of configuring the LBT to be performed according to the channel access priority class for the PDSCH may be considered.

In this case, when the LBT in the subframe in which the PDSCH is transmitted is successful, the MCOT from the corresponding subframe is configured. When an UL subframe in which UL traffic corresponding to the previously scheduled UL grant is transmitted is present in the corresponding MCOT, the type 2 channel access may be performed to enable fast channel access for UL data transmission.

Or, as a method for performing an LBT used in UE(s) during transmission of UL traffic corresponding to an UL grant, it may be configured to perform the LBT scheme performed during transmission of the UL grant or perform Type 1 channel access when UL traffic is transmitted outside the MCOT obtained by the LBT in the subframe transmitting the PDSCH.

Or, in that case, a method by which the base station signals whether to perform Type 2 channel access to allow the user equipment to have fast channel access as LBT for UL traffic or to perform Type 1 channel access to perform backoff may be considered. The channel access types that the base station may inform the terminal may be transmitted through the UL grant, and the base station may inform either the Type 1 channel access or the Type 2 channel access in the corresponding UL grant. Here, the Type 1 channel access may refer to Cat-4 LBT, and the Type 2 channel access may refer to 25 us LBT.

Method C)

Figure 18:
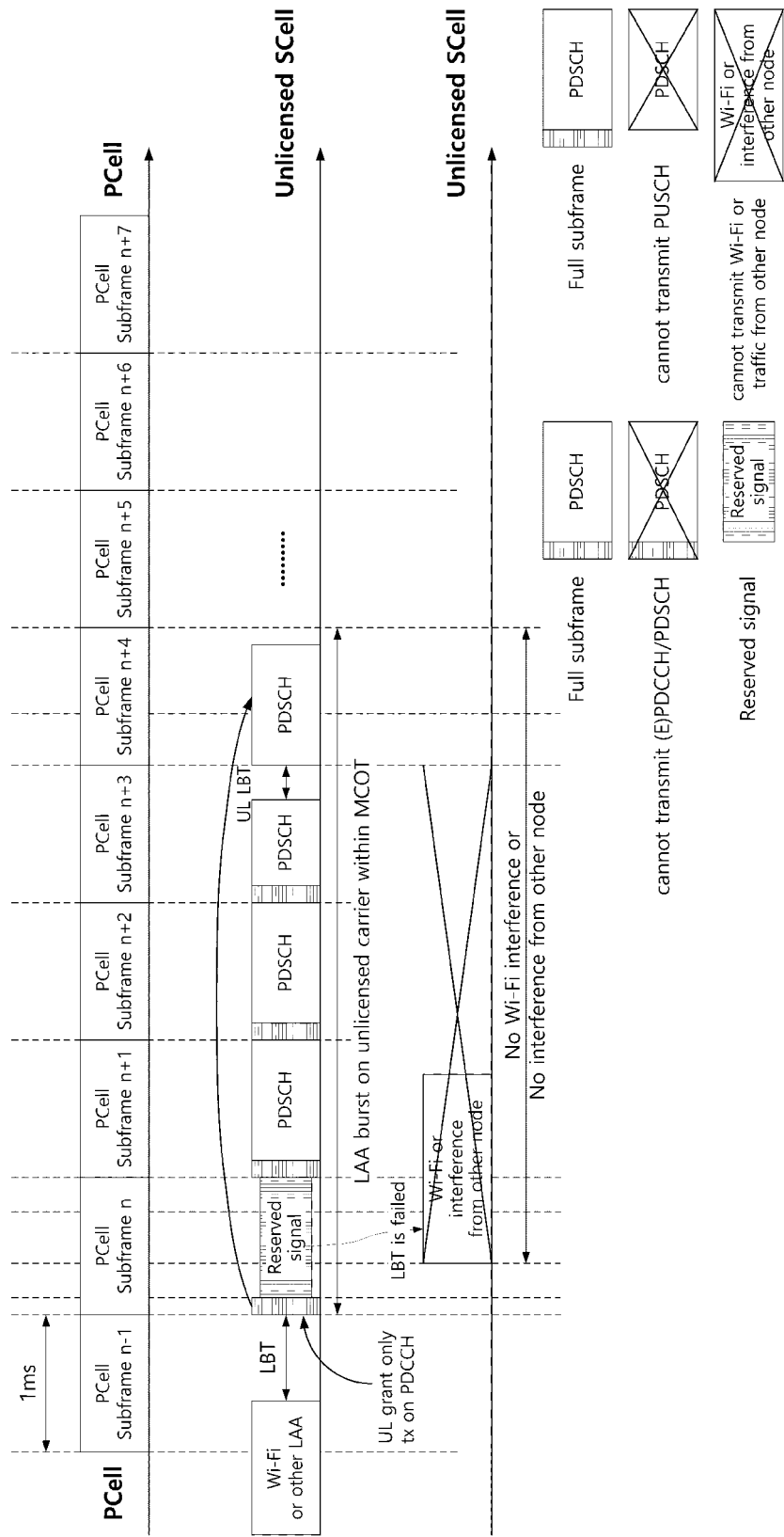
FIG. 18 is a diagram illustrating a case where LBTs for a subframe for transmitting only the UL grant without PDSCH transmission and subframe(s) for performing PDSCH transmission are independently performed according to an embodiment of the present invention.

FIG. 18 is a diagram illustrating a case where LBTs for a subframe for transmitting only the UL grant without PDSCH transmission and subframe(s) for performing PDSCH transmission are independently performed according to an embodiment of the present invention. It is possible to prevent the occurrence of the blanked OFDM symbol(s) in the PDSCH region through the transmission of the reservation signal and to prevent the channel access by the LBT from other nodes. Also, due to this, the PDSCH transmitted in the next subframe may be transmitted without additional LBT in the MCOT.

As an example of a reservation signal, there may be one EPDCCH transmission common to all UEs, and as another example, it is possible to consider a method of extending CRS port 0 and port 1 to extend transmissions in OFDM symbol indexes #0, #4, #5 and #7 to the remaining symbols. Furthermore, it is also possible to consider a form in which CRS ports 0 to 4 arm extended and transmitted, and it is possible to consider a method of transmitting dummy data to an RB in a specific frequency region as a reservation signal.

Also, as a method for performing an LBT used in a UE(s) at the time of transmission of UL traffic corresponding to the UL grant, it is possible to perform the LBT scheme performed during transmission of the UL grant or perform type 2 channel access when UL traffic is transmitted in the MCOT secured in the transmission of the UL grant, thereby enabling quick channel access for UL data transmission.

Or, as a method for performing an LBT used in a UE(s) during transmission of UL traffic corresponding to an UL grant, it may be configured to perform the method of LBT performed during transmission of the UL grant or to perform type 1 channel access when UL traffic is transmitted outside the MCOT obtained in the UL grant transmission.

Or, in that case, a method by which the base station signals whether to perform Type 2 channel access to allow user equipment to have fast channel access as LBT for UL traffic or to perform Type 1 channel access to perform backoff may be considered. The channel access types that the base station may inform the user equipment may be transmitted through the UL grant, and the base station may inform either the Type 1 channel access or the Type 2 channel access in the corresponding UL grant. Here, the Type 1 channel access refers to Cat-4 LBT, and the Type 2 channel access refers to 25 us LBT.

In FIGS. 16 to 18, a case where the starting subframe of the unlicensed carrier-based LAA burst is set as a partial subframe in which UL grant only transmission is performed but the present invention is not limited thereto. As another embodiment, there may be a case where the last subframe of the LAA burst is set as a partial subframe in which UL grant only transmission is performed. In another embodiment, even in a starting subframe of an LAA burst in an unlicensed carrier or in a subframe that is not the last subframe of the LAA burst, a blanked OFDM symbol may be generated in a subframe in which UL grant only transmission is performed, and accordingly, the above-described problems may occur.

Also, although FIGS. 15 to 18 are described with reference to regular subframes, it may be identically applied to a case where the starting subframe is a partial subframe, for example, a subframe composed of OFDM symbols smaller than 14 and a case where the last subframe is a partial subframe.

Below, during UL grant only transmission, in consideration of the channel access priority class of UL traffic corresponding to the UL grant, an LBT method of a DL control channel (e.g., PDCCH, EPDCCH) including an UL grant and an LBT scheme for UL traffic transmission corresponding to an UL grant will be described. In addition, the LBT scheme for UL traffic transmission corresponding to the UL grant when the UL grant is transmitted together with the PDSCH transmission will be described.

First, when the UL grant is transmitted along with the PDSCH transmission, LBTs for the PDCCH and the EPDCCH as the control channel through which the UL grant is transmitted includes performing channel access by using the LBT parameters according to the channel access priority class of the PDSCH (hereinafter, CAPC for convenience).

Table 1 below shows LBT parameters according to the channel access priority class for transmission of the PDSCH as downlink transmission.

TABLE 1

| Channel Access Priority Class | | | | | |
|---|---|---|---|---|---|
| Channel Access Priority Class (p) | $m_p$ | $CW_{min,p}$ | $CW_{max,p}$ | $T_{mcot,p}$ | allowed $CW_p$ sizes |
| 1 | 1 | 3 | 7 | 2 ms | {3, 7} |
| 2 | 1 | 7 | 15 | 3 ms | {7, 15} |

TABLE 1-continued

| Channel Access Priority Class | | | | | |
|---|---|---|---|---|---|
| Channel Access Priority Class (p) | $m_p$ | $CW_{min,p}$ | $CW_{max,p}$ | $T_{mcot,p}$ | allowed $CW_p$ sizes |
| 3 | 3 | 15 | 63 | 8 or 10 ms | {15, 31, 63} |
| 4 | 7 | 15 | 1023 | 8 or 10 ms | {15, 31, 63, 127, 255, 511, 1023} |

As an example, when the CAPC of the PDSCH is 1 or 2, since MCOT is 2 ms or 3 ms, when it is assumed that a minimum time latency of UL grant and UL traffic transmission is 4 ms, the UL traffic transmission corresponding to the UL grant is performed outside the MCOT of the downlink burst to which the UL grant is transmitted. Therefore, the LBT of the UL traffic transmission corresponding to the UL grant may be configured to perform the LBT according to the CAPC of the UL traffic to be transmitted by the user equipment. When there are a plurality of CAPCs for UL traffic to be transmitted instead of one CAPC, the user equipment is configured to perform the Type 1 channel access based on the CAPC having the lowest priority among the plurality of CAPCs.

As another example, when the CAPC of the PDSCH transmitted with the UL grant is 3 or 4, since MCOT is 8 ms or 10 ms, UL traffic transmissions corresponding to UL grants may be transmitted within the MCOT but may also be transmitted outside the MCOT. Therefore, when downlink transmission and UL LBT and UL traffic transmission can occur within the MCOT, a single interval (e.g., 16 us, 25 us, 34 us, 43 us or 16+9*N, N may be a value of 1 or more) LBT is performed regardless of the CAPC of the UL traffic. That is, UL traffic transmission is performed through the Type 2 channel access. On the other hand, in a case where DL transmission and UL LBT and UL traffic transmission do not occur within the MCOT, the Type 2 channel access is performed for UL transmission that may occur within the MCOT regardless of the CAPC of the UL traffic but for UL traffic transmissions scheduled to be transmitted outside the MCOT, the user equipment may be configured to perform LBT according to the CAPC of UL traffic to be transmitted by the user equipment. When there are a plurality of CAPCs of UL traffic to be transmitted by the corresponding user equipment, the corresponding user equipment may perform the Type 1 channel access based on the CAPC having the lowest priority among the plurality of CAPCs.

As another example, in a case where the CAPC of the PDSCH transmitted with the UL grant is set to 3 and the UL grant is also performed according to CAPC 3, if the CAPC of the UL traffic that the user equipment actually wants to transmit is set to 3 or less, the UL traffic is transmitted through the type 2 channel access regardless of the CAPC of the UL traffic. However, if the CAPC of the UL traffic is 4, regardless of whether the corresponding UL traffic transmission occurs within the MCOT, it may be set to perform type 1 channel access with LBT parameters according to CAPC 4 of UL traffic to perform UL transmission. Also, when the CAPC of the PDSCH transmitted with the UL grant is configured to 4 and the transmission of the UL grant is also performed according to CAPC 4, regardless of the CAPC of the UL traffic that the user equipment actually wants to transmit, the user equipment may perform UL traffic transmission through the Type 2 channel access.

As another example, when the LBT is performed through the CAPC value X of the PDSCH transmitted with the UL grant, for CAPC values of UL traffic less than or equal to X, a UL traffic transmission through the Type 2 channel access may be performed. In other cases, the user equipment may be configured to perform LBT according to the CAPC of the UL traffic to be transmitted by the user equipment. When there are a plurality of CAPCs of UL traffic to be transmitted by the corresponding user equipment, the corresponding user equipment may be configured to perform Type 1 channel access based on the CAPC having the lowest priority among the plurality of CAPCs.

<UL LBT Type Switching>

Hereinafter, a method of switching the type of the UL LBT when performing UL channel access will be described.

The base station informs the user equipment of the LBT type and parameters for the LBT that the user equipment should perform. The base station may specify the LBT type through the UL grant, and inform the type 1 channel access, the type 2 channel access, or the No LBT as the LBT type.

Figure 19:
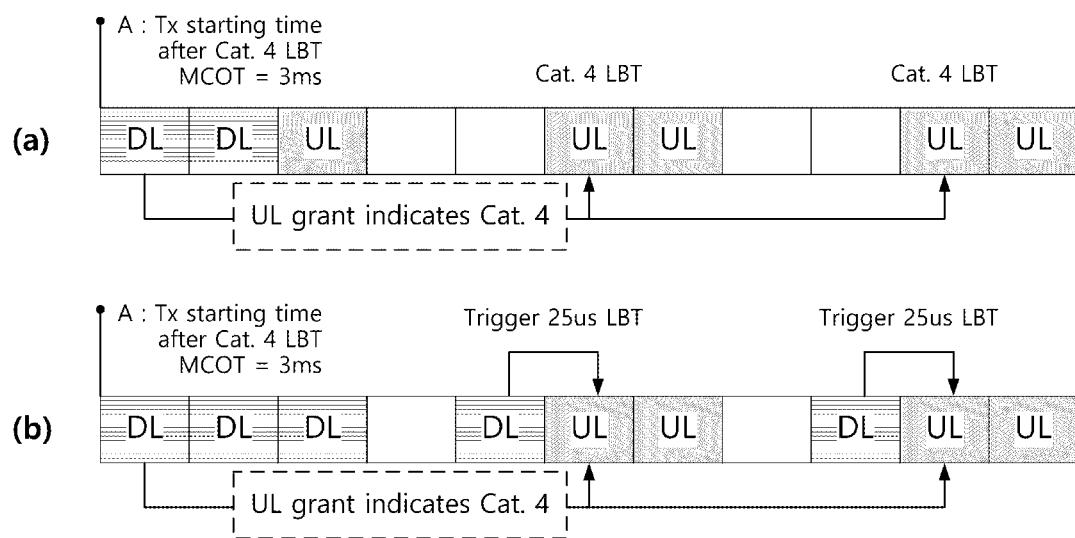
FIG. 19 is a diagram illustrating an example of switching an LBT type according to an embodiment of the present invention when DL scheduling occurs between UL grant transmission and corresponding UL traffic transmission.

FIG. 19 is a diagram illustrating a method of switching an LBT type according to an embodiment of the present invention when DL scheduling occurs between UL grant transmission and corresponding UL traffic transmission. In particular, in FIG. 19, the base station informs the user equipment of the LBT type through the UL grant, but it is assumed that DL scheduling occurs between the UL grant transmission and the corresponding UL transmission.

FIG. 19(a) informs to perform a type 1 channel access through an UL grant for UL traffic transmission in the sixth subframe or the tenth subframe from the first DL subframe. In this case, the user equipment may perform type 1 channel access and perform UL transmission. In FIG. 19(a), since MCOT is set to 3 ms from the first DL subframe, the UL traffic transmission scheduled in the sixth or tenth subframe does not exist within the MCOT set in the DL. Thus, the base station may instruct the user equipment to perform type 1 channel access for UL transmission.

Unlike this, when UL traffic transmission exists in the MCOT set in the DL, for example, when the configured MCOT from the first DL subframe is 8 ms, the base station may indicate the user equipment to perform type 2 channel access through the UL grant, and the indicated user equipment may perform type 2 channel access to transmit UL traffic.

In FIG. 19(b), under the assumption that it is indicated to perform type 1 channel access through the UL grant for transmission of the UL traffic configured in the sixth subframe or the tenth subframe from the first DL subframe, when DL scheduling is performed as in the fifth subframe in FIG. 19(b) prior to UL traffic transmission that has already been scheduled, a method may be considered in which the user equipment that has performed the DL reception may change the channel access type indicated in the UL grant that the user equipment receives from the first DL subframe.

In other words, when there is UL transmission in the MCOT configured in the DL, since a base station may transmit UL traffic through a type 2 channel access, it may be configured to transmit UL traffic through a Type 2 channel access, rather than an indicated Type 1 channel access. Thus, the base station may provide a triggering message to enable the user equipment to perform Type 2 channel access, so that the user equipment receiving the triggering message may perform Type 2 channel access to transmit UL traffic.

However, when the UL grant indicated by the base station is configured to perform continuous multiple subframes scheduling via one UL grant like FIGS. 19(a) and (b), that is, it is required to consider a case where the first DL subframe is configured to perform the scheduling of the sixth UL subframe and the seventh UL subframe in FIGS. 19(a) and (b). Especially, when the DL traffic to be transmitted by the base station occurs and the DL scheduling is performed in the 5th subframe and the MCOT is set to 2 ms in the DL transmission, for UEs that is scheduled for the sixth and seventh consecutive multiple UL subframes in the first DL subframe, the UL LBT configured for the UL transmission in the sixth and seventh consecutive subframes is located within the newly set MCOT 2 ms. Thus, UL traffic transmission may be possible through switching from the Type 1 channel access to the Type 2 channel access. However, because the LBT time point of the sixth subframe is located in the MCOT of 2 ms despite the LBT for the seventh subframe being located outside the MCOT of 2 ms, it may benefit from performing fast channel access, so that fairness problems may arise between systems using other unlicensed bands. In order to improve this, according to an embodiment of the present invention, a user equipment that is scheduled for UL transmission of multiple subframes in the sixth subframe may consider a method of performing the Type 1 channel access for UL transmission of the seventh subframe.

On the other hand, when the length of the entire UL burst (i.e., the sixth and seventh subframes) is not included in the newly set DL MCOT, a method of performing a channel access type configured by the previously UL grant, that is, the Type 1 channel access configured by the UL grant from the first DL subframe may be considered in FIG. 19(b).

Although the UL burst in the sixth subframe and the seventh subframe is described with reference to FIG. 19, it may be identically applied to the UL bursts in the tenth subframe and the eleventh subframe.

Figure 20:
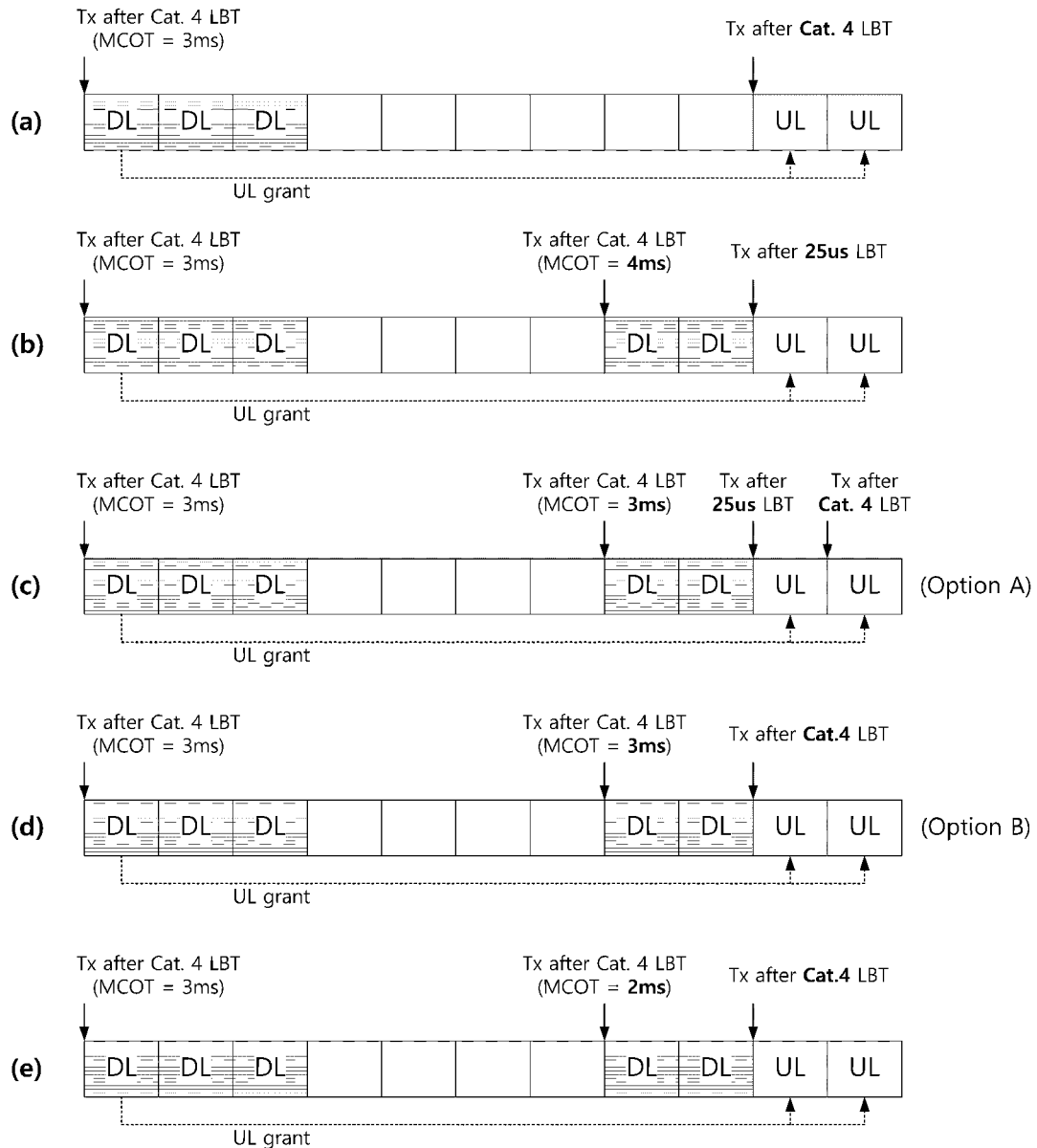
FIG. 20 is a diagram illustrating another example of switching an LBT type according to an embodiment of the present invention when DL scheduling occurs between UL grant transmission and corresponding UL traffic transmission.

FIG. 20 is a diagram illustrating another example of switching a channel access type according to another embodiment of the present invention when DL scheduling occurs between UL grant transmission and corresponding UL traffic transmission. In the same manner, especially, in FIG. 20, the base station informs the user equipment of the channel access type through the UL grant, but it is assumed that DL scheduling occurs between the UL grant transmission and the corresponding UL transmission. Additionally, in FIG. 20, it is assumed that a channel access type for an UL burst is informed when multiple subframes are scheduled, and a user equipment performs a corresponding LBT.

In FIG. 20(a), the base station schedules the tenth UL subframe and the eleventh UL subframe in the first, second or third DL subframe, i.e., through the UL grant on the preceding DL burst, and indicate to perform the Type 1 channel access as the associated channel access type and transmit UL traffic.

By the way, as shown in FIG. 20(b), when DL scheduling (e.g., the eighth subframe and the ninth subframe) occurs between the UL grant transmission and the corresponding UL traffic transmission, when the MCOT of the DL burst includes the tenth and eleventh UL subframes, which are UL bursts, an UL traffic transmission exists in the MCOT of the DL. Therefore, the channel access type for the tenth UL subframe and the eleventh UL subframe is switched to the type 2 channel access to transmit the UL traffic.

On the other hand, as shown in FIG. 20(c), if the MCOT of the DL burst occurring between the UL grant transmission and the corresponding UL traffic transmission does not include the UL burst, i.e., the tenth UL subframe and the eleventh UL subframe, it allows to perform the Type 2 channel access only for UL subframes included in the MCOT among UL bursts, and if not, transmit the UL traffic by performing the type 1 channel access for the eleventh subframe.

Also, as shown in FIG. 20(d), when the length of the entire UL burst in which the multiple subframes is scheduled is not included within the newly formed MCOT, a UL burst LBT is performed using the channel access type previously instructed from the base station through the UL grant to transmit the UL traffic.

Finally, in FIG. 20(e), when DL scheduling (eighth subframe and ninth subframe) occurs between the UL grant transmission and the corresponding UL traffic transmission, if the MCOT of the DL burst does not include any portion of the UL burst, an UL burst LBT is performed using the channel access type previously instructed from the base station through the UL grant to transmit the UL traffic.

Figure 21:
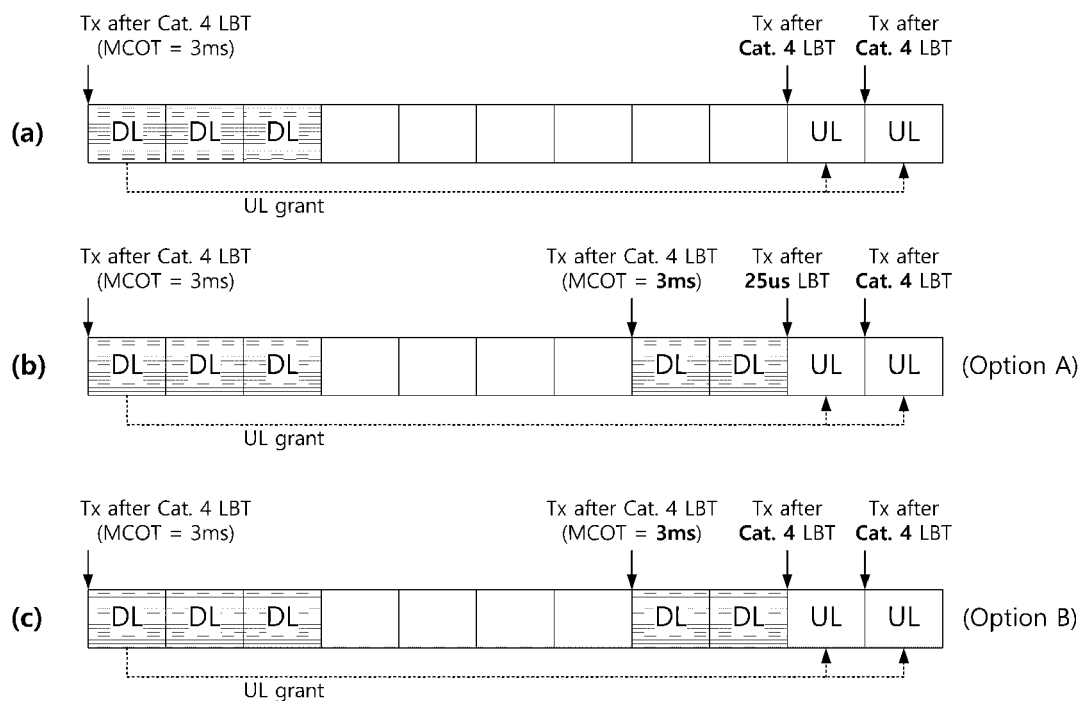
FIG. 21 is a diagram illustrating another example of switching an LBT type according to an embodiment of the present invention when DL scheduling occurs between UL grant transmission and corresponding UL traffic transmission.

FIG. 21 is a diagram illustrating another example of switching a channel access type according to an embodiment of the present invention when DL scheduling occurs between UL grant transmission and corresponding UL traffic transmission. Especially, in FIG. 21, the base station informs the user equipment of the channel access type through the UL grant, but it is assumed that DL scheduling occurs between the UL grant transmission and the corresponding UL transmission. Also, in FIG. 21, it is assumed that a channel access type for each of UL subframes constituting an UL burst is informed when multiple subframes or a single subframe is scheduled and the user equipment performs the corresponding LBT.

In FIG. 21(a), the base station schedules the tenth UL subframe and the eleventh UL subframe in the first, second or third DL subframe, i.e., through the UL grant on the preceding DL burst, and instructs to perform the Type 1 channel access for each UL subframe and transmit UL traffic.

However, as shown in FIG. 21(b), if the MCOT of the DL burst occurring between the UL grant transmission and the corresponding UL traffic transmission does not include the UL burst, i.e., the tenth UL subframe and the eleventh UL subframe, it transmits the UL traffic by allowing to perform the Type 2 channel access for UL subframes included in the MCOT among UL bursts and not to perform the Type 1 channel access for the eleventh subframe not included in the MCOT.

Also, as shown in FIG. 21(c), when the length of the entire UL burst in which the multiple subframes is scheduled is not included within the newly formed MCOT, an LBT is performed using the channel access type previously instructed from the base station through the UL grant to transmit the UL traffic.

An implicit or explicit signaling method from the base station for the switching of the LBT type described from FIGS. 19 to 21 may be considered, and as an implicit signaling, by determining whether there is transmission of the UL burst in the newly formed MCOT through reception of the first DL subframe on the DL burst, it is possible to change the channel access type for UL transmission and perform LBT to transmit UL traffic.

Or, as an explicit signaling, if DL scheduling occurs between the UL grant transmission and the corresponding UL traffic transmission, the base station may transmit signaling for changing the channel access type to the user equipment, and the user equipment may change the channel access type through the reception of the corresponding signaling to transmit the UL traffic. Or, the base station informs the user equipment of the MCOT of each DL burst, and if the UL burst is configured to finish the UL burst within the MCOT configured by the base station, the user equipment may change the channel access type to perform LBT through Type 2 channel access and transmit UL traffic.

<UL Burst Indication>

Meanwhile, if the base station schedules UL transmissions to multiple user equipments, the base station may know whether the UL subframe to be scheduled is the last UL subframe for the UEs in the cell at the time of transmitting the UL grant. Accordingly, it is preferable that the base station signals whether the subframe to be scheduled for the UEs is the last subframe. As the signaling method, there may be an informing method through a DL common control signal for DL or an informing method through UL common control signal when transmitting UL grant.

As an example of the above-described common control signal may represent a PDCCH having a DCI scrambled by a CC-RNTI. The base station may inform the UEs about the last subframe of the UL subframe through the common control signal. If the scheduled UL subframe(s) are all included before the last subframe in the cell indicated by the common control signal, the user equipment may perform the Type 2 channel access to perform UL transmission in the scheduled UL subframe(s) regardless of the channel access type indicated for the scheduled UL subframe(s) by the base station.

On the other hand, when the scheduled UL subframe(s) which is scheduled are only partially included or not all included before the last subframe in the cell indicated by the common control signal, the user equipment may perform channel access according to the channel access type indicated for the UL subframe(s) which is scheduled by the base station and perform UL transmission in the UL subframe(s) which is scheduled.

<Method of Performing LBT for Continuous UL Transmission after DL Transmission>

Hereinafter, a UL channel access method for continuous UL transmission after DL transmission in the LAA cell will be described.

Figure 22:
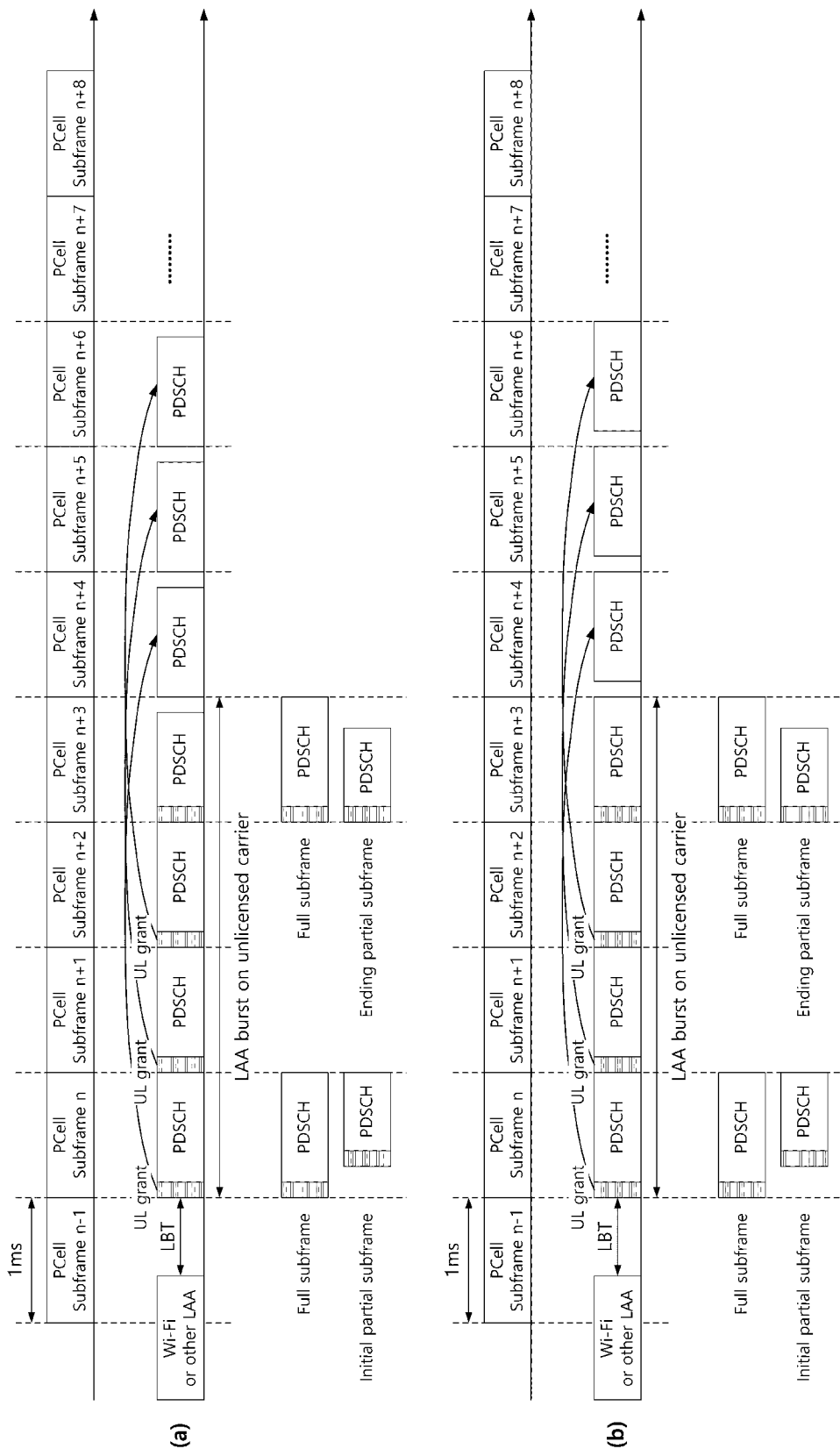
FIG. 22 is a diagram illustrating a method of performing UL channel access for continuous UL transmission after DL transmission in an LAA cell.

FIG. 22 is a diagram illustrating a method of performing UL channel access for continuous UL transmission after DL transmission in an LAA cell.

As in FIG. 22, even if the base station transmits the UL grant in the subframe #n to the user equipment and the UL transmission is scheduled in the subframe #(n+4), any user equipment may recognize through the PDCCH/EPDCCH that the PDSCH for the user equipment itself is included in the DL transmission from the base station in the subframe #(n+3), or recognize its DL scheduling through PDCCH/EPDCCH and succeed in decoding PDSCH.

In this case, DL reception is completed, and the UL traffic transmission of the user equipment may be performed with no UL LBT immediately after certain interval (e.g., 16 us, 20 us, or 25 us, or any other value) from time at the DL reception is completed, or with only the Type 2 channel access. Since the LBT is performed once in DL during UL grant transmission, so that in addition, for UL transmissions intended by the UL grant, the user equipment may not perform UL LBT additionally, or perform a simple LBT operation without backoff to transmit UL traffic.

Here, when UL traffic is transmitted after a certain interval, the transmission after a specific period may be considered irrespective of the subframe boundary, or the transmission may be performed in correspondence to the OFDM symbol (or SC-FDMA symbol) boundary. Alternatively, there may be a method of transmitting UL traffic in correspondence to UL subframe boundaries. However, it may be preferable to consider the switching time from DL to UL when setting the certain interval.

Figure 23:
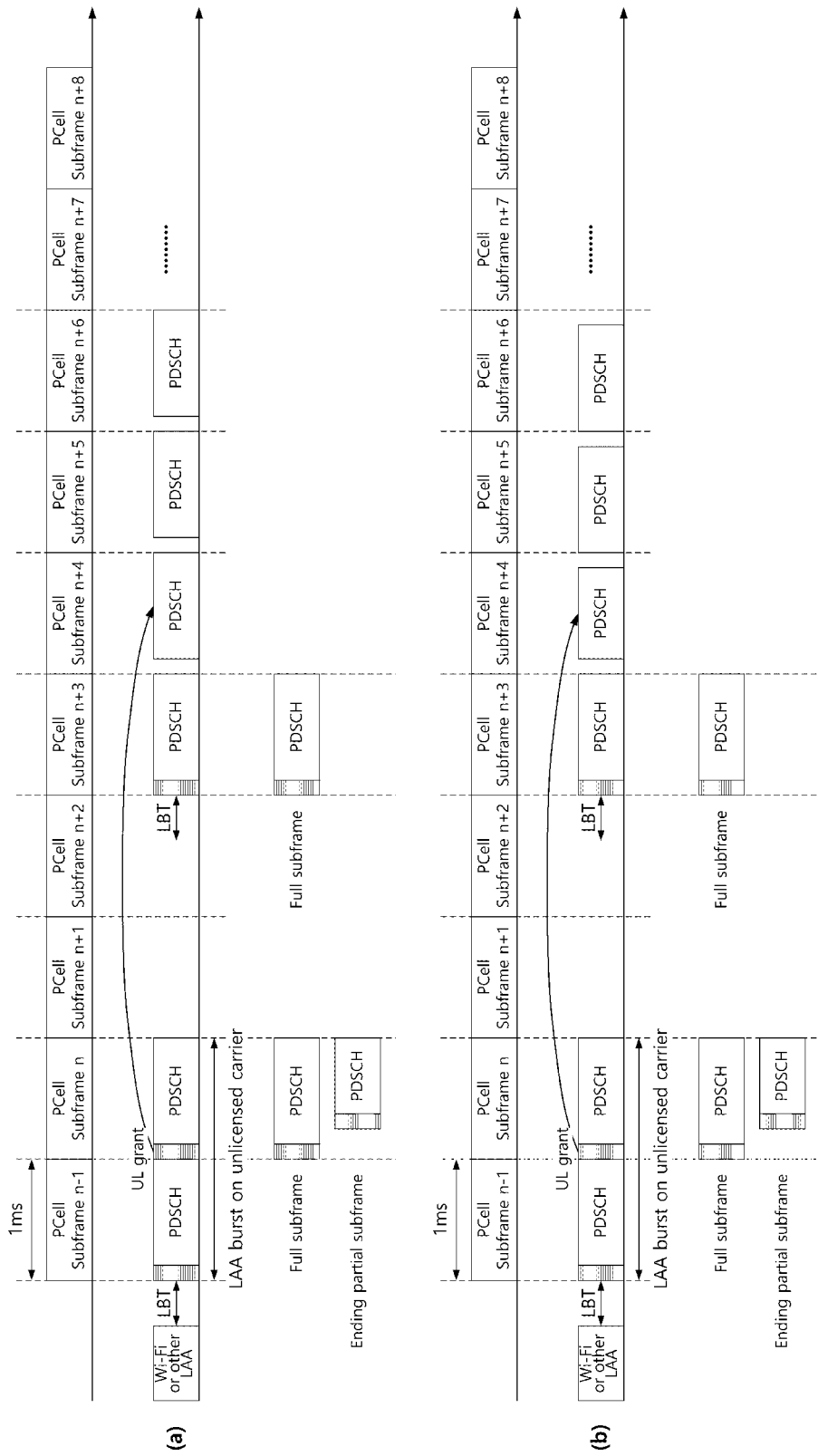
FIG. 23 shows an example in which a terminal transmits a data channel to a base station according to another embodiment of the present invention.

FIG. 23 shows an example in which a user equipment transmits a data channel to a base station according to another embodiment of the present invention.

Referring to FIG. 23, when the UL transmission is scheduled continuous to the DL subframe in the same carrier, the user equipment may start a UL transmission according to a channel access procedure that is not based on a backoff procedure. Specifically, the user equipment may perform the Type 2 channel access and start UL transmission based on whether the channel is idle during a single sensing interval.

Specifically, the user equipment senses whether the channel is idle during the single sensing interval. If the channel is idle, the user equipment may start UL transmission through the corresponding channel. At this time, the single sensing interval may represent the minimum time interval of the idle time interval required for the user equipment to access the channel. At this time, the user equipment may determine whether the corresponding channel is idle through a Clear Channel Assessment (CCA) operation. In addition, the user equipment may start UL transmission at the subframe boundary. At this time, the user equipment may sense whether the channel corresponding to the UL transmission is idle during a single sensing interval, for example, 25 us interval, and may start UL transmission when the corresponding channel is idle. At this time, the concrete operation of the user equipment may be the same as the method of transmitting the UL by performing the Type 2 channel access described above.

Figure 24:
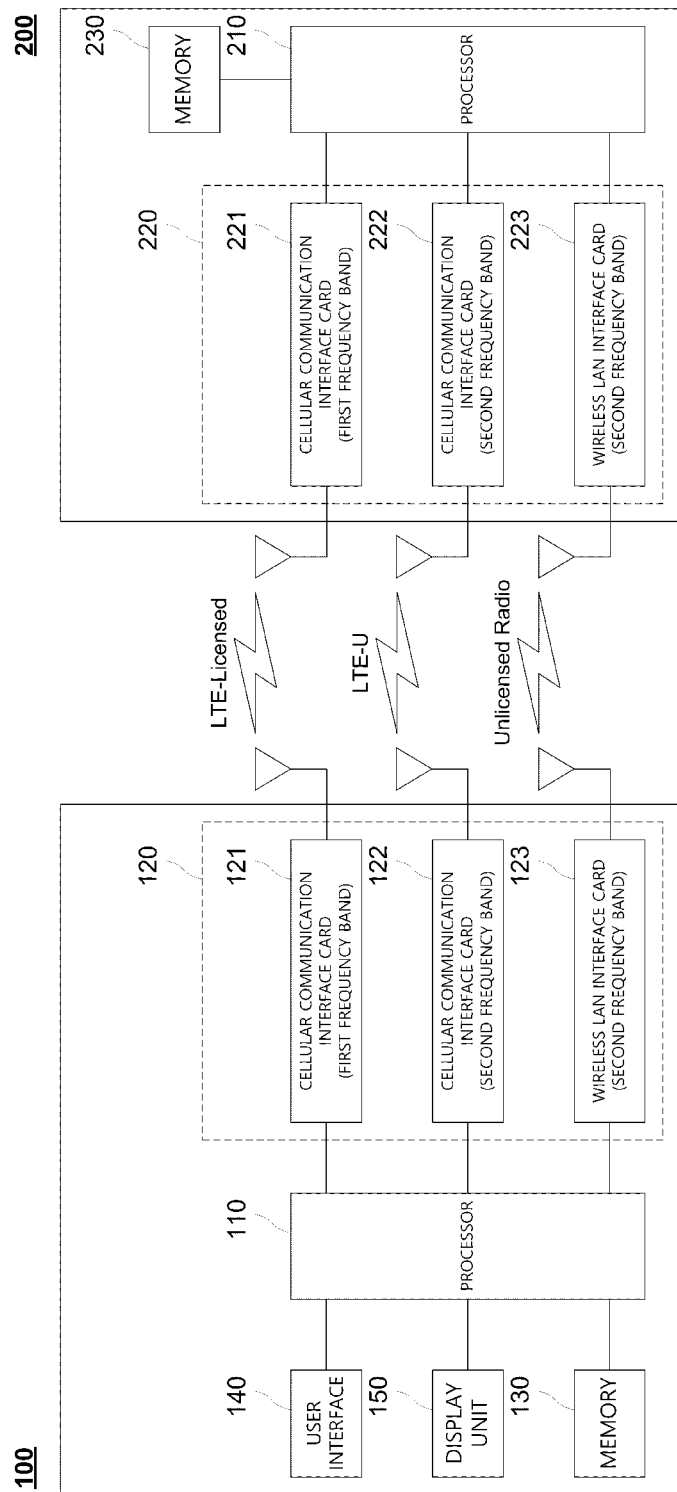
FIG. 24 illustrates a configuration of a user equipment and a base station according to an embodiment of the present invention.

FIG. 24 illustrates a configuration of a user equipment and a base station according to an embodiment of the present invention. The embodiment of the present invention, the user equipment may be implemented by various types of wireless communication devices or computing devices that are guaranteed to be portable and mobility. The user equipment may be referred to as a station (STA), an Mobile Subscriber (MS), or the like. In the embodiment of present invention, the base station may control and manage a cell (eg, macrocell, femtocell, picocell, etc.) corresponding to a service area and perform function such as transmitting signal, designating channel, monitoring channel, self-diagnosis, relay. The base station may be referred to as an evolved NodeB (eNB), an access point (AP), or the like.

Referring to FIG. 24, the user equipment 100 may include a processor 110, a communication module 120, a memory 130, a user interface unit 140, and a display unit 150.

The processor 110 may execute various commands or programs according to the present invention and process data in the user equipment 100. Further, the processor 100 may control all operations of the respective units of the user equipment 100 and control data transmission/reception among the units. For example, the processor 110 may receive the DL signal in LTE-U cell of LAA environment, may transmit HARQ-ACK response fort the DL signal to the base station.

The communication module 120 may be an integrated module that performs mobile communication using a mobile communication network and wireless LAN access using a wireless LAN. To this end, the communication module 120 may include a plurality of network interface cards such as cellular communication interface cards 121 and 122 and a wireless LAN interface card 123 in an internal or external type. In FIG. 24, the communication module 120 is illustrated as the integrated module, but the respective network interface cards may be independently disposed according to a circuit configuration or a purpose unlike FIG. 24.

The cellular communication interface card 121 transmits/receives a radio signal to/from at least one of a base station 200, an external device, and a server by using the mobile communication network and provides a cellular communication service at a first frequency band based on a command of the processor 110. The cellular communication interface card 121 may include at least one NIC module using an LTE-licensed frequency band. The cellular communication interface card 122 transmits/receives the radio signal to/from at least one of the base station 200, the external device, and the server by using the mobile communication network and provides the cellular communication service at a second frequency band based on the command of the processor 110. The cellular communication interface card 122 may include at least one NIC module using an LTE-unlicensed frequency band. For example, the LTE-unlicensed frequency band may be a band of 2.4 GHz or 5 GHz.

The wireless LAN interface card 123 transmits/receives the radio signal to/from at least one of the base station 200, the external device, and the server through wireless LAN access and provides a wireless LAN service at the second frequency band based on the command of the processor 110. The wireless LAN interface card 123 may include at least one NIC module using a wireless LAN frequency band. For example, the wireless LAN frequency band may be an unlicensed radio band such as the band of 2.4 GHz or 5 GHz.

The memory 130 stores a control program used in the user equipment 100 and various resulting data. The control program may include a program required for the user equipment 100 to perform wireless communication with at least one of the base station 200, the external device, and the server. The user interface 140 includes various types of input/output means provided in the user equipment 100. The display unit 150 outputs various images on a display screen.

Further, the base station 200 according to the exemplary embodiment of the present invention may include a processor 210, a communication module 220, and a memory 230.

The processor 210 may execute various commands or programs according to the present invention and process data in the base station 200. Further, the processor 210 may control all operations of the respective units of the base station 200 and control data transmission/reception among the units. For example, the processor 210 may perform the downlink transmission. Specifically, the processor 210 may perform downlink transmission, HARQ-ACK feedback set check, and CWS adjustment, etc according to the case 1, 2-1, 2-2.

The communication module 220 may be an integrated module that performs the mobile communication using the mobile communication network and the wireless LAN access using the wireless LAN like the communication module 120 of the user equipment 100. To this end, the communication module 120 may include a plurality of network interface cards such as cellular communication interface cards 221 and 222 and a wireless LAN interface card 223 in the internal or external type. In FIG. 18, the communication module 220 is illustrated as the integrated module, but the respective network interface cards may be independently disposed according to the circuit configuration or the purpose unlike FIG. 18.

The cellular communication interface card 221 transmits/receives the radio signal to/from at least one of the user equipment 100, the external device, and the server by using the mobile communication network and provides the cellular communication service at the first frequency band based on a command of the processor 210. The cellular communication interface card 221 may include at least one NIC module using the LTE-licensed frequency band. The cellular communication interface card 222 transmits/receives the radio signal to/from at least one of the user equipment 100, the external device, and the server by using the mobile communication network and provides the cellular communication service at the second frequency band based on the command of the processor 210. The cellular communication interface card 222 may include at least one NIC module using the LTE-unlicensed frequency band. The LTE-unlicensed frequency band may be the band of 2.4 GHz or 5 GHz.

The wireless LAN interface card 223 transmits/receives the radio signal to/from at least one of the user equipment 100, the external device, and the server through the wireless LAN access and provides the wireless LAN service at the second frequency band based on the command of the processor 210. The wireless LAN interface card 223 may include at least one NIC module using the wireless LAN frequency band. For example, the wireless LAN frequency hand may be the unlicensed radio band such as the band of 2.4 GHz or 5 GHz.

In FIG. 24, blocks of the user equipment and the base station logically divide and illustrate elements of the device. The elements of the device may be mounted as one chip or a plurality of chips according to design of the device. Further, some components of the user equipment 100, that is to say, the user interface 140 and the display unit 150 may be selectively provided in the user equipment 100. Further, some components of the base station 200, that is to say, the wireless LAN interface 223, and the like may be selectively provided in the base station 200. The user interface 140 and the display unit 150 may be additionally provided in the base station 200 as necessary.

The method and the system of the present invention are described in association with the specific embodiments, but some or all of the components and operations of the present invention may be implemented by using a computer system having a universal hardware architecture.

The description of the present invention is used for illustration and those skilled in the art will understand that the present invention can be easily modified to other detailed forms without changing the technical spirit or an essential feature thereof. Therefore, the aforementioned exemplary embodiments are all illustrative in all aspects and are not limited. For example, each component described as a single type may be implemented to be distributed and similarly, components described to be distributed may also be implemented in a combined form.

The scope of the present invention is represented by the claims to be described below rather than the detailed description, and it is to be interpreted that the meaning and scope of the claims and all the changes or modified forms derived from the equivalents thereof come within the scope of the present invention.

INDUSTRIAL APPLICABILITY

The present invention is applicable to various communication devices used in a wireless communication system (e.g., a station using an unlicensed band communication, an access point, or a station using a cellular communication, a base station, etc.).

The invention claimed is:

1. A method for operating a first station in a wireless communication system, the method comprising:
receiving, from a second station, a grant that schedules a second transmission to the second station in at least one subframe through an unlicensed cell;
determining a channel access type for performing the second transmission among a first type channel access and a second type channel access according to a predetermined interval determined based on a first transmission through the unlicensed cell from the second station, wherein the first type channel access is based on a channel sensing with a random backoff using a CW (contention window) of variable size before data transmission, wherein the second type channel access is based on a channel sensing with a single interval before data transmission; and
performing the second transmission in the at least one subframe using the determined channel access type,
wherein the second transmission is performed using the second type channel access when all of the second transmission is included in the predetermined interval.

2. The method of claim 1, wherein the grant indicates a channel access type to be used among the first type channel access or the second type channel access in the second transmission.

3. The method of claim 1, wherein when the second transmission is not included in the predetermined interval or only a part of the second transmission is included in the predetermined interval, the second transmission is performed using a channel access type indicated in the grant.

4. The method of claim 1, wherein the predetermined interval is determined based on a maximum channel occupation time set by the first transmission.

5. The method of claim 1, wherein information on whether the at least one subframe is a last subframe for the second transmission is received through a common control channel.

6. The method of claim 1, wherein when the second transmission is performed in the next subframe of the first transmission through the unlicensed cell, the second transmission is performed using the second type channel access.

7. A first station of a wireless communication system, the first station comprising:
a wireless communication module; and
a processor configured to:
receive, from a second station, a grant that schedules a second transmission to the second station in at least one subframe through an unlicensed cell,
determine a channel access type for performing the second transmission among a first type channel access and a second type channel access according to a predetermined interval determined based on a first transmission through the unlicensed cell from the second station, and
perform, through the wireless communication module, the second transmission using the determined channel access type, wherein the first type channel access is based on a channel sensing with a random backoff using a CW (contention window) of variable size before data transmission, wherein the second type channel access is based on a channel sensing with a single interval before data transmission,
wherein the processor is configured to perform the second transmission using the second type channel access when all of the second transmission is included in the predetermined interval.

8. The first station of claim 7, wherein the grant indicates a channel access type to be used among the first type channel access or the second type channel access in the second transmission.

9. The first station of claim 7, wherein when the second transmission is not included in the predetermined interval or only a part of the second transmission is included in the predetermined interval, the processor is configured to perform the second transmission using a channel access type indicated in the grant.

10. The first station of claim 7, wherein the predetermined interval is determined based on a maximum channel occupation time set by the first transmission.

11. The first station of claim 7, wherein information on whether the at least one subframe is a last subframe for the second transmission is received through a common control channel.

12. The first station of claim 7, wherein when the second transmission is performed in the next subframe of the first transmission through the unlicensed cell, the processor is configured to perform the second transmission using the second type channel access.

* * * * *